US011277851B2

United States Patent
Stefanatos et al.

(10) Patent No.: US 11,277,851 B2
(45) Date of Patent: Mar. 15, 2022

(54) SLOT STRUCTURE FOR SUPERPOSITION TRANSMISSION USING A SINGLE ANTENNA PORT

(71) Applicant: QUALCOMM Incorporated, San Diego, CA (US)

(72) Inventors: Stelios Stefanatos, San Diego, CA (US); Shuanshuan Wu, San Diego, CA (US); Arthur Gubeskys, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/005,059

(22) Filed: Aug. 27, 2020

(65) Prior Publication Data
US 2021/0329662 A1 Oct. 21, 2021

(30) Foreign Application Priority Data
Apr. 16, 2020 (GR) .............................. 20200100198

(51) Int. Cl.
*H04W 72/12* (2009.01)
*H04L 5/00* (2006.01)
(Continued)

(52) U.S. Cl.
CPC ....... *H04W 72/1215* (2013.01); *H04L 5/0026* (2013.01); *H04L 5/0044* (2013.01);
(Continued)

(58) Field of Classification Search
CPC ......... H04W 72/1215; H04W 72/1263; H04W 88/06; H04W 92/18; H04L 5/0026; H04L 5/0044
(Continued)

(56) References Cited

U.S. PATENT DOCUMENTS

2018/0262288 A1    9/2018   Gao et al.
2018/0368153 A1* 12/2018   Li .......................... H04W 72/12
(Continued)

FOREIGN PATENT DOCUMENTS

WO    WO-2019196690 A1    10/2019

OTHER PUBLICATIONS

Estimation of EMF for base stations using signal decoding technique Sangbong Jeon, IEEE Mar. 2019 (Year: 2019).*
(Continued)

*Primary Examiner* — Hirdepal Singh
(74) *Attorney, Agent, or Firm* — Danai Nelisile Mhembere; Holland & Hart LLP

(57) ABSTRACT

Methods, systems, and devices for wireless communications are described. A UE may support superimposed NR and LTE transmissions using an antenna port, in conjunction with an LTE-aware, NR slot structure (e.g., an NR V2X slot structure). In some aspects, the slot structure may protect portions of the LTE signal from interference, increasing LTE decoder robustness to interference which may provide opportunities for increasing the NR signal power. The UE may transmit a superimposed transmission of an LTE signal and an NR signal from a same antenna port in a same radio frequency resource. In some aspects, the slot structure may be modified so that the UE does not transmit when LTE reference signals are transmitted, so as to avoid interference with the LTE reference signals. A receiving UE may use the LTE reference signals to demodulate the LTE signal and the NR signal from the common time and frequency resources.

27 Claims, 15 Drawing Sheets

(51) Int. Cl.
*H04W 88/06* (2009.01)
*H04W 92/18* (2009.01)

(52) U.S. Cl.
CPC ........ *H04W 72/1263* (2013.01); *H04W 88/06* (2013.01); *H04W 92/18* (2013.01)

(58) Field of Classification Search
USPC ........................................................ 375/260
See application file for complete search history.

(56) References Cited

U.S. PATENT DOCUMENTS

| | | | |
|---|---|---|---|
| 2020/0067584 A1* | 2/2020 | Kang | H04L 5/0082 |
| 2020/0229128 A1* | 7/2020 | Xue | H04W 48/18 |
| 2020/0396701 A1* | 12/2020 | Yi | H04W 72/1242 |
| 2021/0029675 A1 | 1/2021 | Ji | |
| 2021/0105055 A1* | 4/2021 | Chae | H04B 7/088 |

OTHER PUBLICATIONS

International Search Report and Written Opinion—PCT/US2021/022527—ISA/EPO—dated Oct. 13, 2021.

\* cited by examiner

SLOT STRUCTURE FOR SUPERPOSITION TRANSMISSION USING A SINGLE ANTENNA PORT

CROSS REFERENCE

The present Application for Patent claims the benefit of Greek Provisional Patent Application No. 20200100198 by STEFANATOS et al., entitled "SLOT STRUCTURE FOR SUPERPOSITION TRANSMISSION USING A SINGLE ANTENNA PORT," filed Apr. 16, 2020, assigned to the assignee hereof, and expressly incorporated by reference herein.

FIELD OF TECHNOLOGY

The following relates generally to wireless communications and more specifically to slot structure for superposition transmission using a single antenna port.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may support both access links and sidelinks. An access link is a communication link between a UE and a base station. A sidelink is a communication link between similar devices. For example, a sidelink may support communications between multiple UEs (e.g., in a vehicle-to-everything (V2X) system, a vehicle-to-vehicle (V2V) system, a vehicle-to-infrastructure (V2I) system, a vehicle-to-network (V2N) system, a device-to-device (D2D) system, among other examples). In some examples, a dual-mode UE may transmit both a legacy LTE broadcast message (e.g., for safety applications) as well as an NR signal (e.g., for sensor sharing applications) at the same time. In such systems, techniques for efficient usage of resources (e.g., frequency resources) and reduced interference may be desirable.

SUMMARY

The described techniques relate to improved methods, systems, devices, and apparatuses that support a slot structure for superposition transmission using a single antenna port. Techniques for device-to-device communications among devices (e.g., user equipment (UEs)) are proposed that ensure reliable communications (e.g., reduced interference) as well as increased throughput. A UE and an additional UE may be in direct communications (e.g., via a sidelink).

In some aspects, the UE may support superimposed New Radio (NR)/Long Term Evolution (LTE) transmissions using one antenna port, in conjunction with an LTE-aware, NR slot structure (e.g., an NR V2X slot structure). In some aspects, the slot structure may protect portions of the LTE signal from interference, increasing LTE decoder robustness to interference, which, in turn, may provide opportunities for increasing the NR signal power. The UE may transmit a superimposed transmission of an LTE signal and an NR signal from a same antenna port in a same radio frequency resource. In some aspects, the slot structure may be modified so that the UE does not transmit when LTE reference signals (e.g., LTE demodulation reference signals (DMRSs)) are transmitted, so as to avoid interference with the LTE reference signals. A receiving UE may use the LTE reference signals to demodulate the LTE signal and the NR signal from the common time and frequency resources.

A method of wireless communications by a UE is described. The method may include communicating control signaling scheduling a superposition transmission of a first signal generated for a first radio access technology and a second signal generated for a second radio access technology, and indicating that the first signal and the second signal are each to be transmitted via a first antenna port within a first transmission time interval, transmitting, via the first antenna port, the first signal within the first transmission time interval in accordance with a first signal format of the first radio access technology that includes at least one reference signal symbol period, and transmitting, via the first antenna port, the second signal in a set of symbol periods of the first transmission time interval other than the at least one reference signal symbol period.

An apparatus for wireless communications by a UE is described. The apparatus may include a processor, memory coupled with the processor, and instructions stored in the memory. The instructions may be executable by the processor to cause the apparatus to communicate control signaling scheduling a superposition transmission of a first signal generated for a first radio access technology and a second signal generated for a second radio access technology, and indicating that the first signal and the second signal are each to be transmitted via a first antenna port within a first transmission time interval, transmit, via the first antenna port, the first signal within the first transmission time interval in accordance with a first signal format of the first radio access technology that includes at least one reference signal symbol period, and transmit, via the first antenna port, the second signal in a set of symbol periods of the first transmission time interval other than the at least one reference signal symbol period.

Another apparatus for wireless communications by a UE is described. The apparatus may include means for communicating control signaling scheduling a superposition transmission of a first signal generated for a first radio access technology and a second signal generated for a second radio access technology, and indicating that the first signal and the second signal are each to be transmitted via a first antenna port within a first transmission time interval, transmitting, via the first antenna port, the first signal within the first transmission time interval in accordance with a first signal format of the first radio access technology that includes at least one reference signal symbol period, and transmitting, via the first antenna port, the second signal in a set of symbol periods of the first transmission time interval other than the at least one reference signal symbol period.

A non-transitory computer-readable medium storing code for wireless communications by a UE is described. The code may include instructions executable by a processor to communicate control signaling scheduling a superposition transmission of a first signal generated for a first radio access technology and a second signal generated for a second radio access technology, and indicating that the first signal and the second signal are each to be transmitted via a first antenna port within a first transmission time interval, transmit, via the first antenna port, the first signal within the first transmission time interval in accordance with a first signal format of the first radio access technology that includes at least one reference signal symbol period, and transmit, via the first antenna port, the second signal in a set of symbol periods of the first transmission time interval other than the at least one reference signal symbol period.

Some examples of the method, apparatuses, and non-transitory computer-readable medium described herein may further include operations, features, means, or instructions for transmitting a reference signal of the first radio access technology within the at least one reference signal symbol period.

In some examples of the method, apparatuses, and non-transitory computer-readable medium described herein, transmitting the first signal may include operations, features, means, or instructions for transmitting the first signal within one or more symbol periods of the first transmission time interval allocated for a sidelink shared channel, a sidelink control channel, or both, in accordance with the first signal format of the first radio access technology.

In some examples of the method, apparatuses, and non-transitory computer-readable medium described herein, transmitting the first signal may include operations, features, means, or instructions for transmitting the first signal within a first bandwidth, where the second signal may be transmitted within the first bandwidth.

In some examples of the method, apparatuses, and non-transitory computer-readable medium described herein, transmitting the first signal may include operations, features, means, or instructions for transmitting the first signal within a first bandwidth, where the second signal may be transmitted within a second bandwidth that may be different than the first bandwidth.

In some examples of the method, apparatuses, and non-transitory computer-readable medium described herein, transmitting the first signal may include operations, features, means, or instructions for transmitting the first signal at a first transmission power level, where the second signal may be transmitted at a second transmission power level that may be different than the first transmission power level.

In some examples of the method, apparatuses, and non-transitory computer-readable medium described herein, transmitting the second signal may include operations, features, means, or instructions for transmitting the second signal in the set of symbol periods that differs from a second signal format for symbol periods within the first transmission time interval for the second radio access technology.

In some examples of the method, apparatuses, and non-transitory computer-readable medium described herein, transmitting the second signal may include operations, features, means, or instructions for transmitting the second signal that may have at least one resource block shifted from a first symbol period to a second symbol within the first transmission time interval to avoid transmitting the at least resource block within the at least one reference signal symbol period.

In some examples of the method, apparatuses, and non-transitory computer-readable medium described herein, transmitting the second signal may include operations, features, means, or instructions for transmitting the second signal based on a frequency offset corresponding to the first radio access technology.

In some examples of the method, apparatuses, and non-transitory computer-readable medium described herein, transmitting the second signal may include operations, features, means, or instructions for transmitting the second signal within one or more symbol periods of the first transmission time interval allocated for a sidelink shared channel, a sidelink control channel, or both, in accordance with the first signal format of the first radio access technology.

In some examples of the method, apparatuses, and non-transitory computer-readable medium described herein, the first radio access technology may be an LTE radio access technology and the second radio access technology may be a NR radio access technology.

A method of wireless communications by a UE is described. The method may include communicating control signaling scheduling a superposition transmission of a first signal generated for a first radio access technology and a second signal generated for a second radio access technology, and indicating that the first signal and the second signal are each to be transmitted via a first antenna port within a first transmission time interval, receiving the first signal within the first transmission time interval in accordance with a first signal format of the first radio access technology that includes at least one reference signal symbol period, and receiving the second signal in a set of symbol periods of the first transmission time interval other than the at least one reference signal symbol period.

An apparatus for wireless communications by a UE is described. The apparatus may include a processor, memory coupled with the processor, and instructions stored in the memory. The instructions may be executable by the processor to cause the apparatus to communicate control signaling scheduling a superposition transmission of a first signal generated for a first radio access technology and a second signal generated for a second radio access technology, and indicating that the first signal and the second signal are each to be transmitted via a first antenna port within a first transmission time interval, receive the first signal within the first transmission time interval in accordance with a first signal format of the first radio access technology that includes at least one reference signal symbol period, and receive the second signal in a set of symbol periods of the first transmission time interval other than the at least one reference signal symbol period.

Another apparatus for wireless communications by a UE is described. The apparatus may include means for communicating control signaling scheduling a superposition transmission of a first signal generated for a first radio access technology and a second signal generated for a second radio access technology, and indicating that the first signal and the second signal are each to be transmitted via a first antenna port within a first transmission time interval, receiving the first signal within the first transmission time interval in accordance with a first signal format of the first radio access technology that includes at least one reference signal symbol period, and receiving the second signal in a set of symbol periods of the first transmission time interval other than the at least one reference signal symbol period.

A non-transitory computer-readable medium storing code for wireless communications by a UE is described. The code may include instructions executable by a processor to communicate control signaling scheduling a superposition transmission of a first signal generated for a first radio access technology and a second signal generated for a second radio access technology, and indicating that the first signal and the second signal are each to be transmitted via a first antenna port within a first transmission time interval, receive the first signal within the first transmission time interval in accordance with a first signal format of the first radio access technology that includes at least one reference signal symbol period, and receive the second signal in a set of symbol periods of the first transmission time interval other than the at least one reference signal symbol period.

Some examples of the method, apparatuses, and non-transitory computer-readable medium described herein may further include operations, features, means, or instructions for receiving a reference signal of the first radio access technology within the at least one reference signal symbol period.

Some examples of the method, apparatuses, and non-transitory computer-readable medium described herein may further include operations, features, means, or instructions for demodulating the first signal, the second reference signal, or both, based on the reference signal.

In some examples of the method, apparatuses, and non-transitory computer-readable medium described herein, receiving the first signal may include operations, features, means, or instructions for receiving the first signal within one or more symbol periods of the first transmission time interval allocated for a sidelink shared channel, a sidelink control channel, or both, in accordance with the first signal format of the first radio access technology.

In some examples of the method, apparatuses, and non-transitory computer-readable medium described herein, receiving the first signal may include operations, features, means, or instructions for receiving the first signal within a first bandwidth, where the second signal may be transmitted within the first bandwidth.

In some examples of the method, apparatuses, and non-transitory computer-readable medium described herein, receiving the first signal may include operations, features, means, or instructions for receiving the first signal within a first bandwidth, where the second signal may be transmitted within a second bandwidth that may be different than the first bandwidth.

In some examples of the method, apparatuses, and non-transitory computer-readable medium described herein, receiving the second signal may include operations, features, means, or instructions for receiving the second signal in the set of symbol periods that differs from a second signal format for symbol periods within the first transmission time interval for the second radio access technology.

In some examples of the method, apparatuses, and non-transitory computer-readable medium described herein, receiving the second signal may include operations, features, means, or instructions for receiving the second signal that may have at least one resource block shifted from a first symbol period to a second symbol within the first transmission time interval to avoid transmitting the at least resource block within the at least one reference signal symbol period.

In some examples of the method, apparatuses, and non-transitory computer-readable medium described herein, receiving the second signal may include operations, features, means, or instructions for receiving the second signal based on a frequency offset corresponding to the first radio access technology.

In some examples of the method, apparatuses, and non-transitory computer-readable medium described herein, receiving the second signal may include operations, features, means, or instructions for receiving the second signal within one or more symbol periods of the first transmission time interval allocated for a sidelink shared channel, a sidelink control channel, or both, in accordance with the first signal format of the first radio access technology.

In some examples of the method, apparatuses, and non-transitory computer-readable medium described herein, the first radio access technology may be an LTE radio access technology and the second radio access technology may be a NR radio access technology.

DETAILED DESCRIPTION

Figure 1:
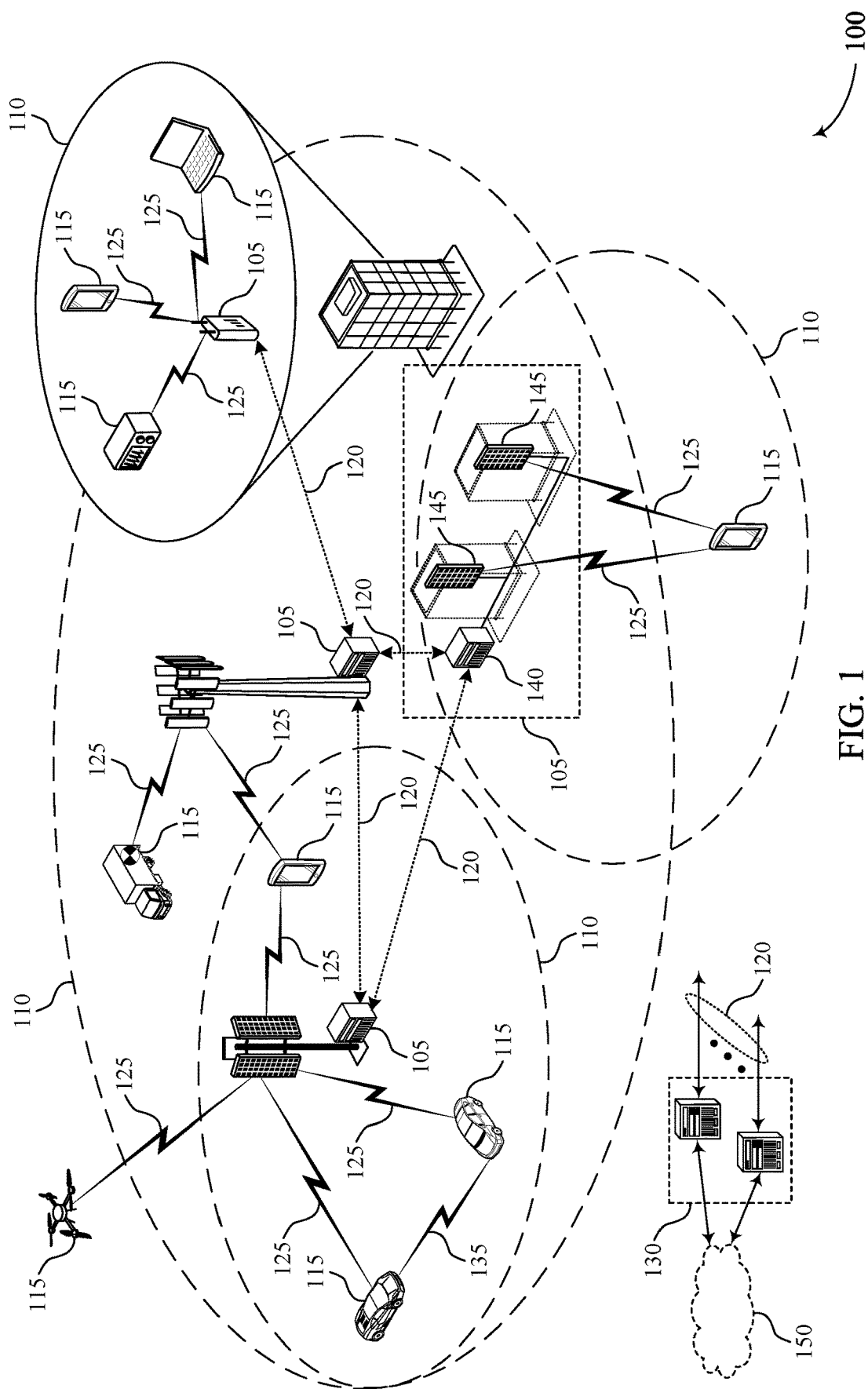
FIG. 1 illustrates an example of a system for wireless communications in accordance with aspects of the present disclosure.

A wireless communications system may support both access links and sidelinks for communications between wireless devices. An access link may refer to a communication link between a user equipment (UE) and a base station. For example, an access link may support uplink signaling, downlink signaling, connection procedures, etc. A sidelink may refer to any communication link between similar wireless devices (e.g., a communication link between UEs, or a backhaul communication link between base stations). It is noted that while various examples provided herein are discussed for UE sidelink devices, such sidelink techniques may be used for any type of wireless devices that use sidelink communications. For example, a sidelink may support device-to-device (D2D) communications, vehicle-to-everything (V2X), vehicle-to-vehicle (V2V), vehicle-to-infrastructure (V2I), or vehicle-to-network (V2N) communications, message relaying, discovery signaling, beacon signaling, or any combination of these or other signals transmitted over-the-air from one UE to one or more other UEs.

In some cases, V2X communications have been incorporated with sidelink modes (e.g., sidelink modes 3 and 4) to support related applications such as safety applications using periodic broadcast messages. In some other cases, V2X communications have been incorporated for uses such as sensor sharing. Some features of V2X communications may include feedback (e.g., distance-based feedback), flexible resource selection to accommodate aperiodic traffic, and multicast or unicast transmissions. In some LTE-V2X devices, backward compatibility issues arise, as such LTE devices may be unable to "understand" NR devices. For example, an NR V2X waveform (e.g., cyclic prefix (CP)-orthogonal frequency division multiplexing (OFDM)) waveform may be different than an LTE V2X waveform (e.g., single-carrier frequency division multiplexing (SC-FDM) waveform), and some dual-mode capable NR devices may include a dedicated transceiver chain for transmitting and receiving LTE V2X signals.

In some examples, when a dual-mode UE transmits both a legacy LTE broadcast message (e.g., for safety applications) as well as an NR signal (e.g., for sensor sharing applications) at the same time, the UE may utilize different frequency resources for each signal. The UE may utilize different frequency resources for the signals, for example, as if the two signals were originated by two different devices. In some cases, in utilizing different frequency resources, the total amount of resources may be twice the resources that would be otherwise be utilized if backward compatibility was of no concern (i.e., all devices were NR capable devices).

Some techniques for circumventing increases in spectrum utilization configure a dual-mode device to transmit both LTE and NR signals on the same resource, based on the principle of multiuser superposition transmission (MUST). In such cases, MUST schemes may specify that a base layer (e.g., LTE layer) be decoded by a standard (e.g., legacy) receiver treating the superimposed NR signal as additive noise. In some cases, LTE decoding may be successful in cases in which the NR signal has a sufficiently smaller power than the LTE signal. However, such cases may result in poor signal-to-noise ratio (SNR) conditions for the NR signal, which may translate to NR signal decoding failures or low NR data rates.

According to examples of aspects described herein, a UE may support superimposed NR/LTE transmissions using one antenna port, in conjunction with an LTE-aware, NR slot structure (e.g., an NR V2X slot structure). The UE may transmit a superimposed transmission of an LTE signal and an NR signal from a same antenna port in a same radio frequency resource. In some aspects, the NR slot structure may be modified so that the UE does not transmit when LTE reference signals (e.g., LTE DMRSs) are transmitted, so as to avoid or reduce interference with the LTE reference signals. A receiving UE may use the LTE reference signals to demodulate the LTE signal and the NR signal from the common time and frequency resources. Examples of aspects described herein may provide for improved signal-to-interference plus noise ratio (SINR) for LTE signals and increased NR signal power, without degradation to LTE signal decodability (e.g., compared to some MUST schemes). In some examples, the NR slot structure may protect portions of the LTE signal from interference, increasing LTE decoder robustness to interference, which, in turn, may provide opportunities for increasing the NR signal power.

Aspects of the disclosure are initially described in the context of wireless communications systems. Aspects of the disclosure are further illustrated by and described with reference to apparatus diagrams, system diagrams, and flowcharts that relate to slot structure for superposition transmission using a single antenna port.

FIG. 1 illustrates an example of a wireless communications system 100 in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as OFDM or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using V2X communications, V2V communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using V2N communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

Accordingly, wireless communications system 100 may support various techniques for improved SINR for LTE signals and increased NR signal power, without degradation to LTE signal decodability (e.g., compared to some MUST schemes). For example, wireless communications system 100 may support various techniques for providing increased LTE decoder robustness to interference, which may provide opportunities for increasing the NR signal power. As an example, a UE 115 may support superimposed NR/LTE transmissions using one antenna port, in conjunction with an LTE-aware, NR slot structure (e.g., an NR V2X slot structure). The UE 115 may transmit a superimposed transmission of an LTE signal and an NR signal from a same antenna port in a same radio frequency resource. In some aspects, the NR slot structure may be modified so that the UE 115 does not transmit when LTE reference signals (e.g., LTE DMRSs) are transmitted, so as to avoid interference with the LTE reference signals. A receiving UE 115 may use the LTE reference signals to demodulate the LTE signal and the NR signal from the common time and frequency resources.

From an example perspective of a transmitting UE 115, the UE 115 may communicate control signaling scheduling a superposition transmission of a first signal generated for a first radio access technology and a second signal generated for a second radio access technology. In some aspects, the control signaling may indicate that the first signal and the second signal are each to be transmitted via a first antenna port within a first transmission time interval. The UE 115 may transmit, via the first antenna port, the first signal within the first transmission time interval in accordance with a first signal format of the first radio access technology. In some aspects, the first signal format may include at least one reference signal symbol period. The UE 115 may transmit a reference signal of the first radio access technology within the at least one reference signal symbol period. In some aspects, the UE 115 may transmit, via the first antenna port, the second signal in a plurality of symbol periods of the first transmission time interval other than the at least one reference signal symbol period.

From an example perspective of a receiving UE 115, the UE 115 may communicate control signaling scheduling a superposition transmission of a first signal generated for a first radio access technology and a second signal generated for a second radio access technology. In some aspects, the control signaling may indicate that the first signal and the second signal are each to be transmitted via a first antenna port within a first transmission time interval. The UE 115 may receive the first signal within the first transmission time interval in accordance with the first signal format of the first radio access technology. In some aspects, the UE 115 may receive the second signal in the plurality of symbol periods of the first transmission time interval other than the at least one reference signal symbol period. In some examples, the UE 115 may receive a reference signal of the first radio access technology within the at least one reference signal symbol period. The UE 115 may demodulate the first signal, the second signal, or both, based at least in part on the reference signal.

Figure 2:
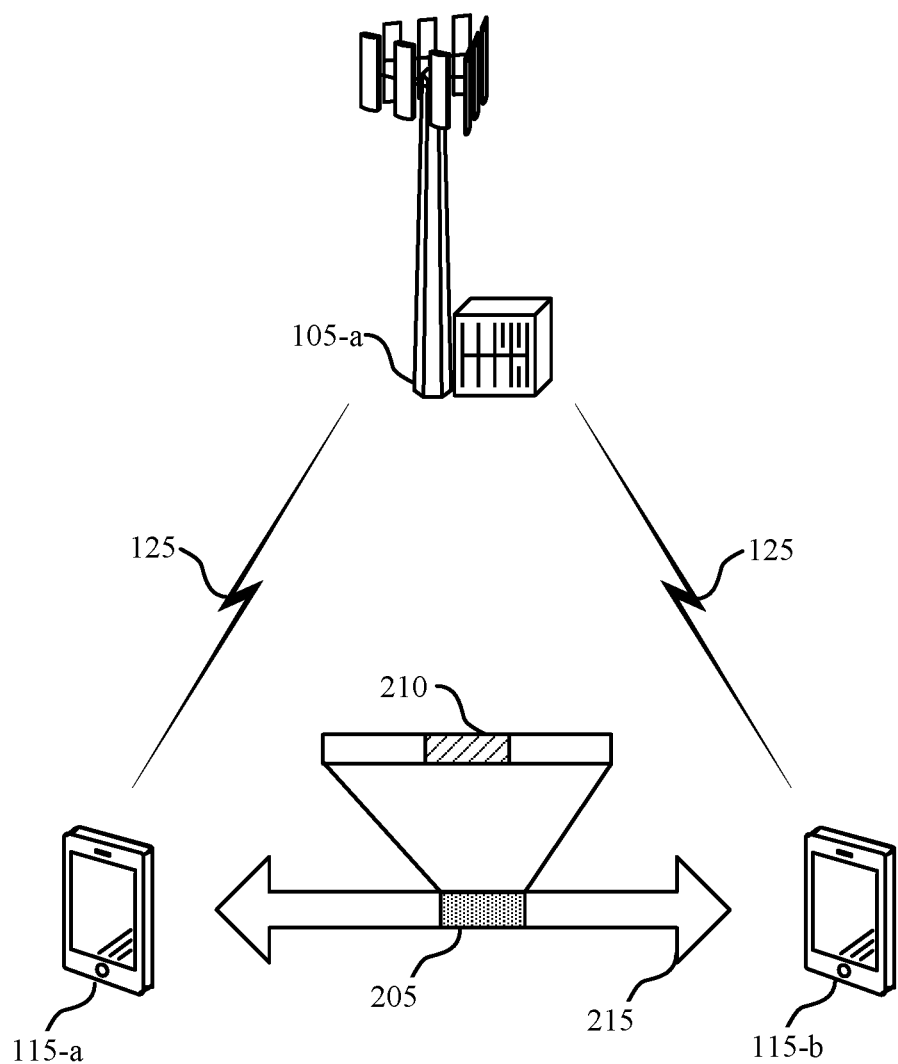
FIG. 2 illustrates an example of a wireless system in accordance with aspects of the present disclosure.

FIG. 2 illustrates an example of a wireless system 200 in accordance with aspects of the present disclosure. In some examples, wireless system 200 may implement aspects of wireless communication system 100. Wireless system 200 may include base station 105-a, which may be an example of base station 105. Wireless system 200 may include UE 115-a and UE 115-b, which may be examples of UE 115. In some cases, UE 115-a and UE 115-b may communicate with each other (e.g., within a V2X system and the like).

UE 115-a, UE 115-b, or both may be in a coverage area of base station 105-a. In such examples, UE 115-a or UE 115-b may communicate with base station 105-a via communication links 125 (e.g., uplink and downlink communications between base station 105-a and UE 115-a and UE 115-b). UE 115-a and UE 115-b may communicate with each other (or with other UEs 115) via base station 105-a or over sidelink communications 205 (e.g., using a V2X protocol) via communications link 215. In some examples, communications link 215 may include uni-directional communications from UE 115-a to UE 115-b (or from UE 115-b to UE 115-a) or bi-directional communications between UE 115-a and UE 115-b. In some cases, communications between UE 115-a and UE 115-b over sidelink communications 205 may be decentralized (e.g., V2X, D2D, direct, as opposed to via the base station 105-a)

UE 115-a (and UE 115-b) may be dual-mode UEs which support superimposed NR/LTE transmissions using one antenna port, in conjunction with an LTE-aware, NR slot structure (e.g., an NR V2X slot structure). UE 115-a may transmit a superimposed transmission of an LTE signal and an NR signal to UE 115-b from a same antenna port in a same radio frequency resource. In some aspects, the NR slot structure may be modified so that UE 115-a does not transmit when LTE reference signals (e.g., LTE DMRSs) are transmitted, so as to avoid or reduce interference with the LTE reference signals. UE 115-b may use the LTE reference signals to demodulate the LTE signal and the NR signal from the common time and frequency resources.

In an example, UE 115-a may communicate control signaling 210 scheduling a superposition transmission of a first signal generated for a first radio access technology (e.g., LTE) and a second signal generated for a second radio access technology (e.g., NR). In some aspects, the control signaling 210 may indicate that the first signal and the second signal are each to be transmitted via a first antenna port of UE 115-a within a first transmission time interval. UE 115-a may transmit, via the first antenna port, the first signal within the first transmission time interval in accordance with a first signal format of the first radio access technology (e.g., an LTE signal format for an LTE slot). In some aspects, the first signal format may include a reference signal symbol period. UE 115-a may transmit a reference signal of the first radio access technology (e.g., LTE demodulation reference signal (DMRS)) within the reference signal symbol period. In some aspects, UE 115-a may transmit, via the first antenna port, the second signal in symbol periods of the first transmission time interval other than the reference signal symbol period of the first signal format.

UE 115-b may receive the first signal within the first transmission time interval in accordance with the first signal format of the first radio access technology (e.g., LTE). In some aspects, UE 115-b may receive the second signal in the symbol periods of the first transmission time interval other than the signal symbol period of the first signal format. In some examples, UE 115-b may receive the reference signal of the first radio access technology (e.g., LTE DMRS) within the reference signal symbol period. UE 115-b may demodulate the first signal, the second signal, or both, based on the reference signal. In some aspects, UE 115-b may communicate control signaling 210.

In some aspects, base station 105-a may communicate control signaling to UE 115-a and UE 115-b indicating scheduled resources (e.g., time and frequency resources of a resource pool) to be used for transmission and reception. For example, as part of sidelink transmission mode 1 ("fully controlled" mode), base station 105-a may communicate the control signaling via downlink control information (DCI). In some other aspects, base station 105-a may communicate control signaling to UE 115-a and UE 115-b indicating available resources (e.g., a configured resource pool) for transmission and reception. For example, as part of sidelink transmission mode 2 ("autonomous" mode) or mode 4

("autonomous" mode independent of cellular coverage), UE 115-a may select a set of resources (e.g., time and frequency resources) from the configured resource pool. In an example, UE 115-a may communicate control signaling 210 to UE 115-b, and the control signaling 210 may indicate the set of resources used by UE 115-a for transmitting the first signal generated for the first radio access technology (e.g., LTE), the second signal generated for the second radio access technology (e.g., NR), or both.

According to examples of aspects described herein, the UE 115-a may identify a configuration associated with dynamically sharing a set of resources between multiple radio access technologies accessible by the UE 115-a. The multiple radio access technologies may include, for example, the first radio access technology (e.g., NR) and the second radio access technology (e.g., LTE). The set of resources may include, for example, a set of BWPs, a set of resource blocks, or a set of resource elements. The UE 115-a may identify the configuration associated with dynamically sharing the set of resources based on, for example, control signaling received by the UE 115-a from the base station 105-a. The control signaling may include, for example, RRC signaling messages or control information (e.g., NR DCI).

Figure 3:
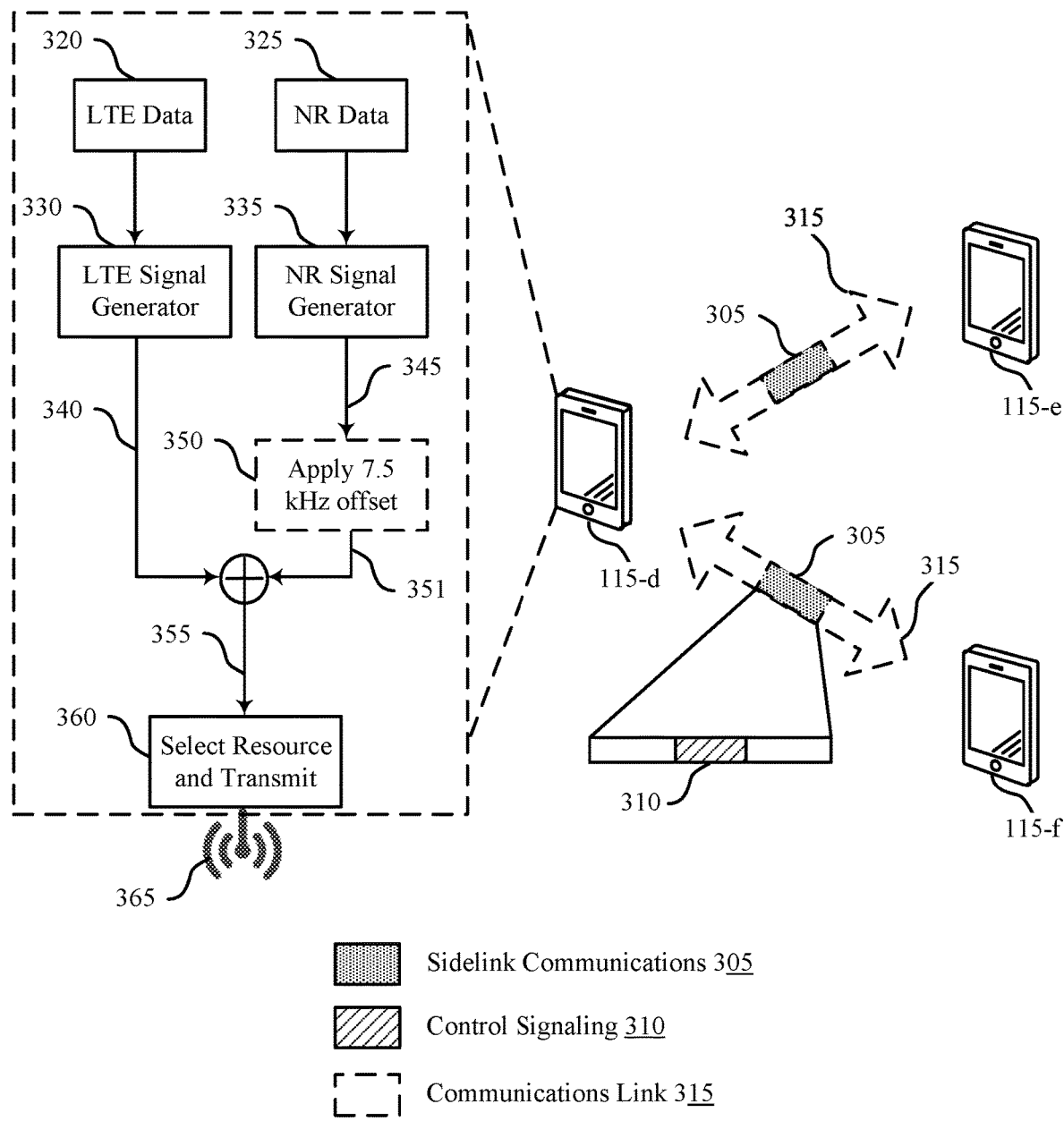
FIG. 3 illustrates an example of a wireless system in accordance with aspects of the present disclosure.

FIG. 3 illustrates an example of a wireless system 300 in accordance with aspects of the present disclosure. In some examples, wireless system 300 may implement aspects of wireless communication system 100 and wireless system 200. Wireless system 300 may include UE 115-d, UE 115-e, and UE 115-f.

In some examples, UE 115-d and UE 115-f may be dual-mode UEs which support superimposed NR/LTE transmissions using one antenna port, in conjunction with an LTE-aware, NR slot structure (e.g., an NR V2X slot structure) as described herein. For example, UE 115-d and UE 115-f may be examples of UE 115-a and UE 115-b described with reference to FIG. 2, respectively. UE 115-e may be an example of UE 115 described with reference to FIG. 1. In an example, UE 115-e may be a legacy device (e.g., legacy LTE device). In some cases, UE 115-d may communicate with UE 115-e and UE 115-f (e.g., within a V2X system and the like) over sidelink communications 305 via communications links 315. Communications links 315 may be examples of aspects of communication link 215 described with reference to FIG. 2.

UE 115-d may include an LTE signal generator 330 and an NR signal generator 335. UE 115-d (e.g., via LTE signal generator 330) may generate an LTE signal 340 (e.g., an LTE SC-FDM signal) based on LTE data 320. UE 115-d (e.g., via NR signal generator 335) NR signal generator may generate an NR signal 345 (e.g., an NR CP-OFDM signal) based on NR data 325. In some aspects, UE 115-d may add the signal waveforms of LTE signal 340 and NR signal 345, for example, in the digital domain and output a signal 355 (e.g., a modulated signal). An example of signal 355 is provided with reference to FIG. 4C described herein.

In some aspects, at 360, UE 115-d may select a set of resources (e.g., time and frequency resources) for transmitting signal 355 (e.g., as specified in control signaling or selected from a resource pool allocated for a sidelink channel). UE 115-d may transmit signal 355 (e.g., LTE signal 340 and NR signal 345) over the set of resources via antenna port 365 (i.e., from the same antenna port of UE 115-d). UE 115-d may transmit both LTE signal 340 and NR signal 345 from antenna port 365, and in some examples, with the same precoding. In some aspects, both LTE signal 340 and NR signal 345 may experience the same physical propagation channel (e.g., via antenna port 365).

Examples of aspects described herein provide advantages over some MUST schemes in which a UE uses dedicated antenna ports for each of NR and LTE signals, which may effectively render the transmission of the NR and LTE signals equivalent to the transmission of the two independent signals from two different devices, experiencing two different channels. For example, since both LTE signal 340 and the NR signal 345 experience the same channel, an LTE reference signal (e.g., LTE DMRS) may be representative of the channel experienced by both LTE signal 340 and NR signal 345. In some aspects, resources which may have otherwise been allocated to an NR DMRS signal may be allocated for data transmission. UE 115-d, for example, may adjust a slot format associated with NR signal 345 in view of the presence and characteristics of LTE signal 340 so as to improve performance (e.g., reduced interference and increased throughput). Example aspects of the resource allocation are described herein with reference to example slot structures 402-b and 403-b of FIG. 4B.

In an example, a dual-mode UE (e.g., UE 115-f) receiving LTE signal 340 and the NR signal 345 may utilize an LTE channel estimate (e.g., determined based on an LTE DMRS) for estimating the radio channel, which may support a corresponding reduction (or even complete elimination) of NR DMRS overhead. For example, UE 115-f may receive signal 355 inclusive of LTE signal 340 and NR signal 345. UE 115-f may decode LTE signal 340 and NR signal 345. In some aspects, UE 115-f (e.g., a decoder of UE 115-f) may estimate the radio channel using the LTE channel estimate (e.g., based on LTE DMRS).

In some cases, LTE signal 340 (e.g., an LTE SC-FDM signal) may have a 7.5 kHz offset applied by the LTE signal generator 330 to avoid having a direct current (DC) subcarrier, whereas NR signal 345 (e.g., NR CP-OFDM signal) may be without an offset. In some cases, LTE signal 340 and NR signal 345 may experience the same physical propagation channels, and the effective (discrete-time equivalent) channel experienced by the LTE signal 340 may be obtained by sampling the channel frequency response with a 7.5 kHz offset compared to the NR effective channel. In some propagation conditions, the physical channel frequency response may be assumed to be constant within a bandwidth of 7.5 kHz (i.e., the physical channel frequency response for the LTE and NR channels may be assumed to be effectively the same).

In some aspects, at 350, UE 115-d may apply a frequency offset (e.g., a 7.5 kHz frequency offset) for transmitting NR signal 345, such that effective LTE and NR channels match. For example, the frequencyShift7p5 kHz parameter in NR may be set to 1 such that the 7.5 kHz frequency offset is applied to NR signal. Enabling the frequency offset may have advantages, for example, at the transmitting side (e.g., at UE 115-d). For example, the transmitted signal may be generated by applying only a single inverse fast Fourier transform (IFFT) to the (element-by-element) sum of NR and LTE pre-IFFT signals. UE 115-d may output NR signal 351, with or without the frequency offset. Example aspects of the applied offset are described later herein with reference to FIG. 4C.

In some aspects, UE 115-d may communicate control signaling 310 (e.g., control signaling 210 described with reference to FIG. 2) to UE 115-e (e.g., legacy LTE device) and UE 115-f. Control signaling 310 may include an indication the superposition transmission of LTE signal 340 and NR signal 345. In some aspects, control signaling 310 may include an indication of a slot structure associated with the superposition transmission. For example, control signaling 310 may include an indication of an NR slot structure (e.g., an NR V2X slot structure). Example aspects of the NR slot structure are described later herein with reference to example slot structures 402-*b* and 403-*b* of FIG. 4B. In some aspects, UE 115-*e* may decode LTE signal 340 and ignore control signaling 310 with respect to the superposition transmission. UE 115-*f* may decode both LTE signal 340 and NR signal 345 based on control signaling 310, aspects of which are described with reference to FIG. 5.

Figures 4A, 4B:
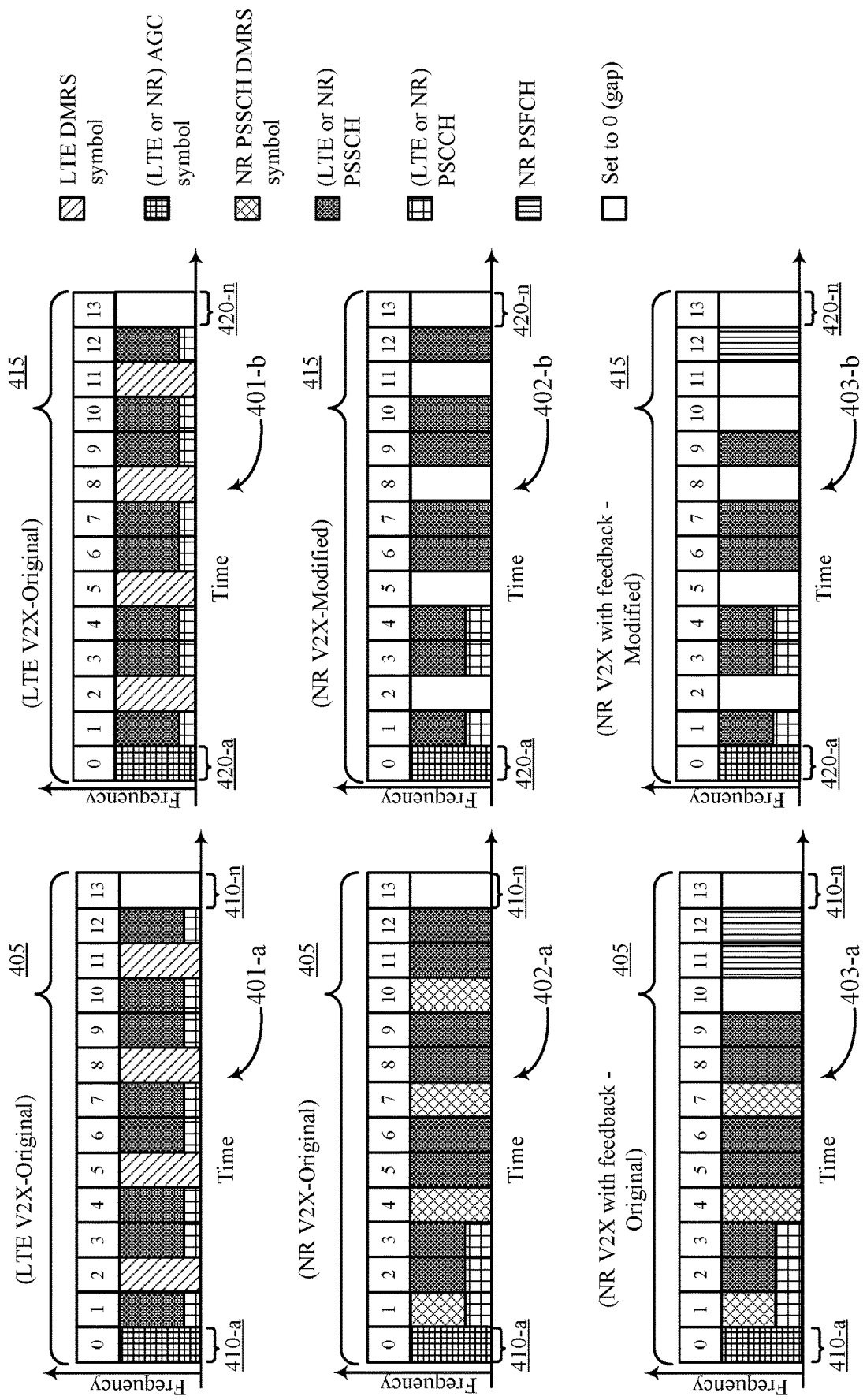
FIG. 4A illustrates an example slot structure for transmission by some devices.
FIG. 4B illustrates an example slot structure for superposition transmission using a single antenna port in accordance with aspects of the present disclosure.

FIG. 4A illustrates example slot structures 401 through 403 for transmission by some devices. FIG. 4A illustrates an example slot structure 401-*a* for an LTE V2X signal (referred to as LTE V2X-Original in FIG. 4A), an example slot structure 402-*a* for an NR V2X signal (referred to as NR V2X-Original in FIG. 4A), and an example slot structure 403-*a* for an NR V2X signal with feedback symbols (e.g., NR physical sidelink feedback channel (PSFCH) symbols) (referred to as NR V2X with feedback-Original in FIG. 4A) over a transmission time interval 405 according to some MUST transmission schemes. The slot structures 401-*a* through 403-*a* may correspond or be referred to as an original signal format associated with MUST transmission schemes. The slot structures 401-*a* through 403-*a* may be, for example, 1 ms LTE-subframe/NR-slot. The transmission time interval 405 may include a set of symbol periods 410-*a* through 410-*n* (corresponding to symbols #0 through 13). In some examples, example slot structures 401-*a* through 403-*a* may be implemented by aspects of wireless communication system 100, wireless communication system 200, and wireless communication system 300.

In some MUST transmission schemes (e.g., with LTE and NR signals having their original formats compared to the modified formats described herein), the NR signal may overlap (e.g., in the time domain) with both the LTE PSSCH and LTE PSCCH, as well as LTE DMRS. In some cases, as the LTE decoder of a receiving device (e.g., some dual-mode UEs) may first obtain a channel estimate using the LTE DMRS symbols and use the LTE DMRS to decode the LTE PSCCH and LTE PSSCH, the effect of interference may increase compared to the cases of a known channel. In some cases, the channel estimates may be negatively impacted by interference, and using the impacted channel estimates as a reference for the equalization of the LTE signal may effectively contribute to increased amounts of interference experienced by LTE PSCCH and LTE PSSCH. In some cases, channel estimates impacted by noise due to the interference may result in noise at the reconstruction of the LTE signal by the dual-mode receiving device, even in cases in which the LTE data is correctly decoded. Accordingly, in some MUST transmission schemes, the LTE DMRS symbols may be inadequately protected from interference.

FIG. 4B illustrates example slot structures 401-*b* through 403-*b* for superposition transmission using a single antenna port in accordance with aspects of the present disclosure. FIG. 4B illustrates an example slot structure 401-*b* for an LTE V2X signal (referred to as LTE V2X-Original in FIG. 4B), an example slot structure 402-*b* for an NR V2X signal (referred to as NR V2X-Modified in FIG. 4B), and an example slot structure 402-*b* for an NR V2X signal with feedback symbols (e.g., NR PSFCH symbols) (referred to as NR V2X with feedback-Modified in FIG. 4B) over a transmission time interval 415. The example slot structure 401-*b* described with reference to FIG. 4B may be the same as the example slot structure 401-*a* described with reference to FIG. 4A. The transmission time interval 415 may include a set of symbol periods 420-*a* through 420-*n*. In some examples, example slot structures 401-*b* through 403-*b* may be implemented by aspects of wireless communication system 100, wireless communication system 200, and wireless communication system 300.

According to examples of aspects described herein, an NR signal may be redistributed (e.g., the NR slot structure may be modified) so that the UE 115 does not transmit when LTE reference signals (e.g., LTE DMRSs) are transmitted, so as to avoid interference with the LTE reference signals. The NR slot structure may be modified for MUST schemes with LTE V2X using the same antenna port.

In some aspects, an NR slot structure (e.g., slot structure 402-*b* of FIG. 4B, referred to as NR V2X-Modified) is proposed by modifying the original NR slot structure (e.g., slot structure 402-*a* of FIG. 4A, referred to as NR V2X-Original). In an example, symbols #2, 5, 8, 11 in an NR slot (e.g., of slot structure 402-*b*), which coincide with the LTE DMRS symbols of the LTE V2X subframe (e.g., of slot structure 401-*b*) may be set to 0 (gap symbols). In some aspects, the gap symbols may be zero power (ZP) channel state information-reference signals (CSI-RS) by NR and may be signaled as such. In some other aspects, the resource blocks of the NR PSCCH that originally occupied (part of) symbol #2 may be shifted to symbol #3. In an example in which the NR slot uses a 3-symbol physical sidelink control channel (PSCCH), the PSCCH resource blocks of symbol #3 may also be shifted by 1 symbol (e.g., to symbol #4). In some other aspects, the remaining parts (e.g., symbol periods) of the NR slot structure may be used for NR PSSCH, except for those that were originally excluded from use for NR PSSCH, such as the last gap symbol of the slot or reserved symbols (e.g., symbols reserved for feedback, for example, NR PSFCH).

In an example in which the original NR slot structure (e.g., slot structure 403-*a* of FIG. 4A, referred to as NR V2X with feedback-Original) includes a feedback symbol (repeated in symbols #11, 12), the feedback symbol may be retained at symbol #12 in the modified NR slot structure (e.g., slot structure 403-*b* of FIG. 4B, referred to as NR V2X with feedback-Modified). In some cases, the repetition of symbol #11 in the original NR slot structure (e.g., slot structure 403-*a* of FIG. 4A) may serve as an automatic gain control (AGC) symbol. In some aspects, the modified NR slot structure (e.g., slot structure 403-*b* of FIG. 4B) may refrain from including this "virtual" AGC symbol since AGC may be established using the superimposed signal energy that was already received. Slot adjustment for different NR slot formats may be obtained according to examples of aspects described herein.

Figure 4C:
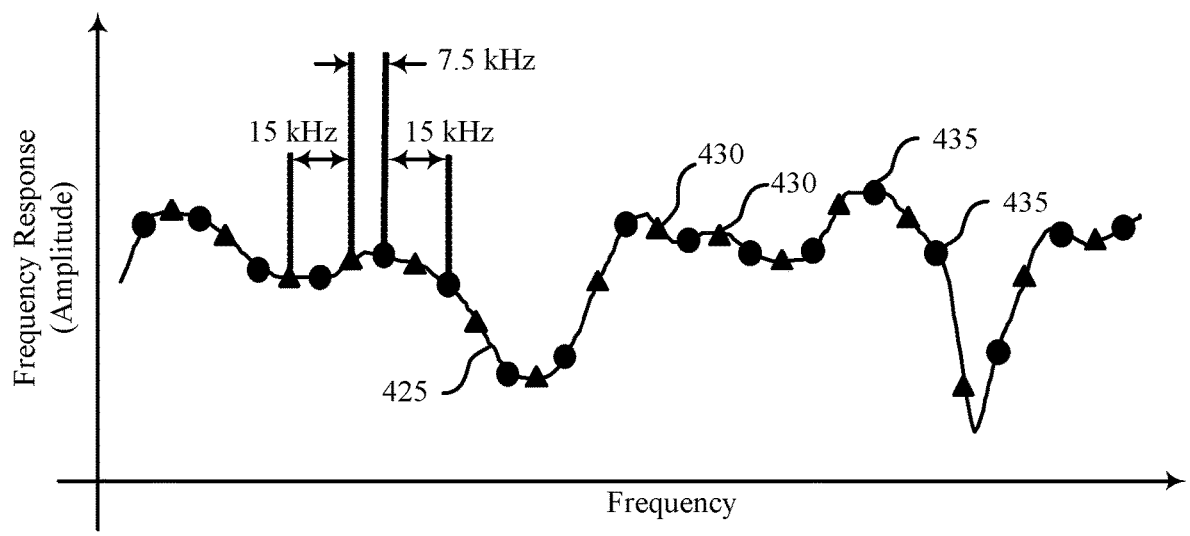
FIG. 4C illustrates an example timing diagram in accordance with aspects of the present disclosure.

FIG. 4C illustrates an example timing diagram 404 in accordance with aspects of the present disclosure. In some examples, example timing diagram 404 may be implemented by aspects of wireless communication system 100, wireless communication system 200, and wireless communication system 300. Example timing diagram 404 illustrates an example of signal 355 (e.g., LTE signal 340 and NR signal 345) output via antenna port 365 of UE 115-*d* described with reference to FIG. 3. Example timing diagram 404 illustrates an example of a difference of channels experienced by LTE signal 340 and NR signal 345 occupying the same bandwidth due to the 7.5 kHz offset of LTE signal 340.

The example timing diagram 404 of FIG. 4C includes a common physical channel frequency response 425 for LTE signal 340 and NR signal 345. The example timing diagram 404 additionally illustrates NR V2X resource grid points 430 (without the 7.5 kHz offset applied at 350) and LTE V2X resource grid points 435.

Figure 5A:
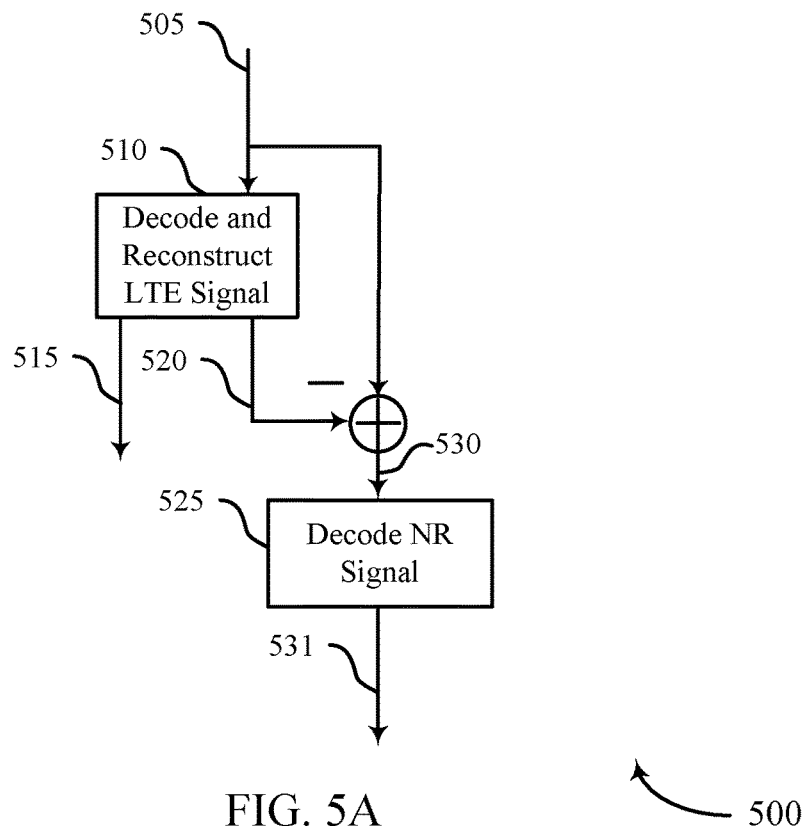
FIGS. 5A and 5B illustrates example diagrams that support slot structure for superposition transmission using a single antenna port in accordance with aspects of the present disclosure.

FIG. 5A illustrates an example diagram 500 for describing receiving and decoding of LTE and NR signals by some dual-mode devices. In some examples, example diagram 500 may be implemented by aspects of wireless communication system 100, wireless communication system 200, and wireless communication system 300.

Referring to FIG. 5A, some dual-mode (e.g., NR/LTE) devices may receive both legacy LTE as well as NR signals. For example, some dual-mode devices may receive both LTE and NR signals that are transmitted via MUST schemes over the same time and frequency resources. Some aspects of MUST schemes may include using an LTE-compatible 15 kHz subcarrier spacing (SCS) numerology for the NR signal so as to avoid complications from using different slots/subframes with a different NR numerology. In some cases, some MUST schemes may include time-synchronization of LTE and NR signals so as to align an NR slot (e.g., in time) with an LTE subframe. Some LTE and NR networks may use a common time reference provided by a Global Navigation Satellite System (GNSS), assuming in-coverage conditions.

In an example, the same bandwidth may be assumed for both LTE and NR signals (e.g., 20 MHz). Some aspects may also be applied to cases with different NR and LTE bandwidths. In some MUST schemes, legacy LTE devices (which are not configured to identify the MUST scheme) may decode the LTE signal as normal (i.e., without consideration of the presence of a superimposed NR signal). The LTE signal may be the first ("base") MUST layer and the NR signal may be the second ("enhanced") MUST layer. In some MUST schemes, the LTE signal may be of sufficiently higher power than the NR signal. In some examples, dual-mode devices may decode both LTE and NR signals using a successive interference cancelation decoder, as described with reference to FIG. 5A.

Example diagram 500 of FIG. 5A may be an example of aspects of some dual-mode devices (e.g., dual-mode UEs). For example, some dual-mode devices may receive an input signal 505 including an LTE signal 520, an NR signal 530, and noise (e.g., $S_{LTE}+S_{NR}$+noise). At 510, some dual-mode devices may decode and reconstruct the LTE signal 520 from the signal 505. Additionally, at 510, some dual-mode devices may output extracted LTE data 515. Some dual-mode devices may subtract the reconstructed LTE signal 520 from the input signal 505, and at 525, decode the NR signal 530. The dual-mode devices may output extracted NR data 531.

Figure 5B:
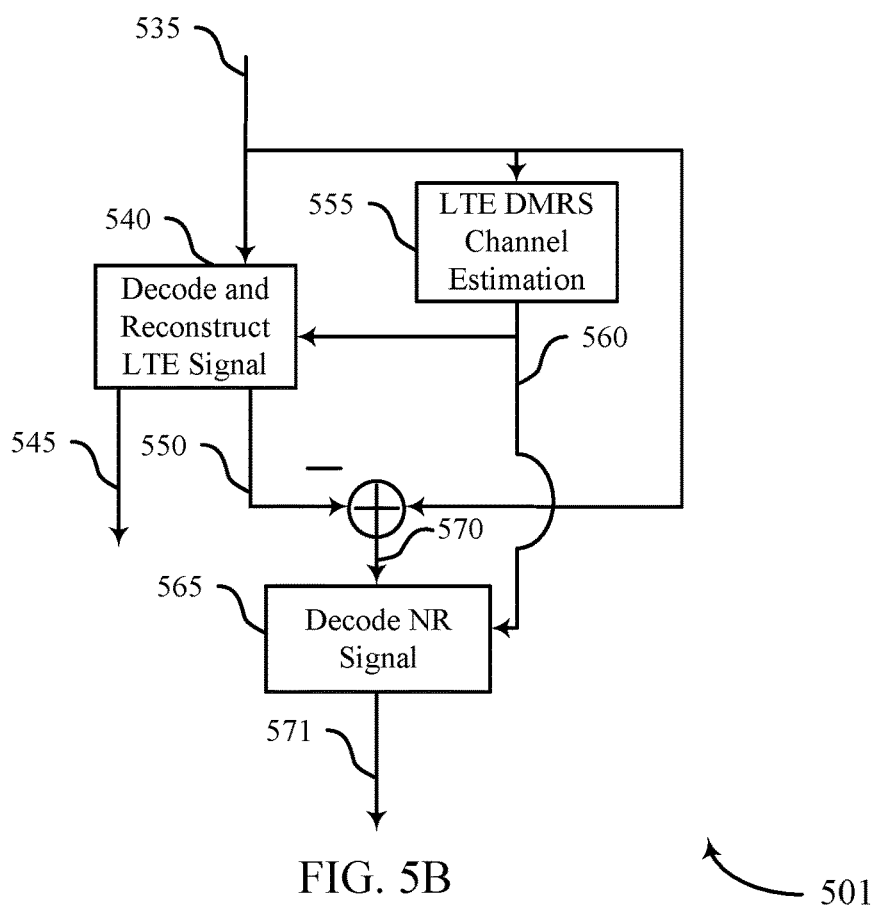

FIG. 5B illustrates an example diagram 501 of a receiving and decoding of LTE and NR signals by a dual-mode device (e.g., dual-mode UE 115) in accordance with aspects of the present disclosure. In some examples, example diagram 501 may be implemented by aspects of wireless communication system 100, wireless communication system 200, and wireless communication system 300. Example diagram 501 of FIG. 5B may be an example of aspects of UE 115-*d* or UE 115-*f* described with reference to FIG. 3.

In some examples, a slot structure (e.g., NR V2X slot) for superposition transmission using a single antenna port in accordance with aspects of the present disclosure may exclude any physical sidelink shared channel (PSSCH) (and, in some aspects, PSCCH) DMRS symbols. In some aspects as described herein, LTE and NR signals may experience the same physical propagation channel (e.g., via the same antenna port of a transmitting device), and the LTE DMRS symbols are protected, and an explicit NR channel estimation may be omitted. In some aspects, NR DMRS symbols may be omitted from an NR slot.

According to the aspects described herein, LTE DMRS symbols may provide a reliable (e.g., reduced interference or interference free) channel estimate that a UE 115 (e.g., UE 115-*f*) may utilize for NR decoding. In some aspects, the LTE channel estimate may be more reliable than an explicit NR channel estimate, even in cases in which the LTE layer (e.g., "base" MUST layer) is completely canceled, since the LTE DMRS power is greater than the NR signal power.

In some aspects, omitting NR DMRS may increase the amount of resources available for data transmissions, which may increase data rates or reliability. In some aspects, the modified NR slot format as described herein (e.g., slot structures 402-*b* and 403-*b* of FIG. 4B) may have almost the same number of resource elements available for data as the original NR slot format (e.g., slot structures 402-*a* and 403-*a* of FIG. 4A). In some aspects, based on operational conditions (e.g., speed), the NR signal may also remove DMRS from PSCCH and utilize the LTE DMRS for NR PSCCH channel estimation.

Example diagram 501 is described herein with reference to UE 115-*f*. In some aspects, UE 115-*f* may receive an input signal 535 including an LTE signal 550, an NR signal 570, and noise (e.g., $S_{LTE}+S_{NR}$+noise). The input signal 535 may also include an LTE DMRS. At 540, UE 115-*f* may decode and reconstruct the LTE signal 550 from the signal 535. Additionally, at 540, UE 115-*f* may output extracted LTE data 545. UE 115-*f* may subtract the reconstructed LTE signal 550 from the input signal 535, and at 565, decode the NR signal 570. UE 115-*f* may output extracted NR data 571. In some aspects, UE 115-*f* may determine an LTE channel estimate 560 (e.g., based on the LTE DMRS) at 555. UE 115-*f* may demodulate LTE signal 550, NR signal 570, or both, based on the LTE DMRS and the corresponding LTE channel estimate 560.

Figure 6:
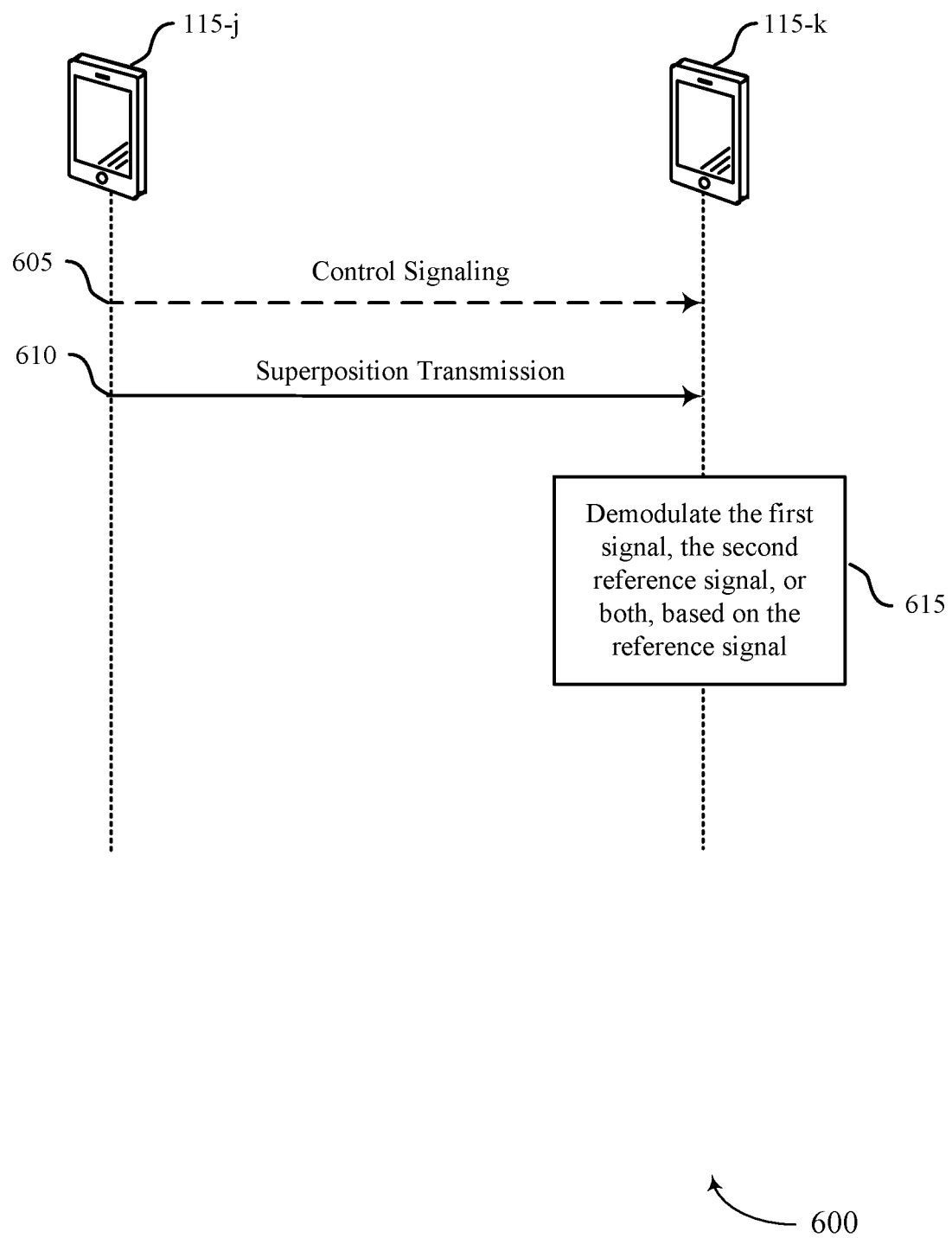
FIG. 6 illustrates an example of a process flow in accordance with aspects of the present disclosure.

FIG. 6 illustrates an example of a process flow 600 in accordance with aspects of the present disclosure. In some examples, process flow 600 may be implemented by aspects of wireless communication system 100, wireless communication system 200, and wireless communication system 300. In process flow 600, UE 115-*j* and UE 115-*k* may be dual-mode UEs which support superimposed NR/LTE transmissions using one antenna port, in conjunction with an LTE-aware, NR slot structure (e.g., an NR V2X slot structure) as described herein. UE 115-*j* may be an example of aspects of UE 115, UE 115-*a*, UE 115-*d*, and example 501 described herein. UE 115-*k* may be an example of aspects of UE 115, UE 115-*b*, UE 115-*f*, and example diagram 501 described herein.

At 605, UE 115-*j* may communicate control signaling scheduling a superposition transmission of a first signal generated for a first radio access technology (e.g., LTE) and a second signal generated for a second radio access technology (e.g., NR). In some aspects, the control signaling may indicate that the first signal and the second signal are each to be transmitted via a first antenna port of UE 115-*j* within a first transmission time interval.

At 610, UE 115-*j* may transmit, via the first antenna port of UE 115-*j*, a superposition transmission within the first transmission time interval. The superposition transmission may include the first signal generated for a first radio access technology (e.g., LTE), the second signal generated for the second radio access technology (e.g., NR), and the reference signal of the first radio access technology. In an example of transmitting the superposition transmission, UE 115-*j* may transmit the first signal within the first transmission time interval in accordance with a first signal format of the first radio access technology. In some aspects, the first signal format may include a reference signal symbol period. In the example of transmitting the superposition transmission, UE 115-*j* may transmit the second signal in symbol periods of the first transmission time interval other than the reference signal symbol period of the first signal format. In the example of transmitting the superposition transmission, UE 115-*j* may transmit the reference signal of the first radio access technology (e.g., LTE DMRS) within the reference signal symbol period.

In some aspects, UE 115-*k* may receive the superposition transmission. In an example of receiving the superposition transmission, UE 115-*k* may receive the first signal within the first transmission time interval in accordance with the first signal format of the first radio access technology (e.g., LTE). In some aspects, UE 115-*k* may monitor resources indicated in the control signaling for the first signal. In the example of receiving the superposition transmission, UE 115-*k* may receive the reference signal of the first radio access technology (e.g., LTE DMRS) within the reference signal symbol period. In the example of receiving the superposition transmission, UE 115-*k* may receive the second signal in the symbol periods of the first transmission time interval other than the signal symbol period of the first signal format. In some aspects, UE 115-*k* may monitor resources indicated in the control signaling for the second signal.

At 615, UE 115-*k* may demodulate the first signal, the second signal, or both, based on the reference signal.

In some aspects, a base station (e.g., base station 105-*a*) may communicate control signaling to UE 115-*j* and UE 115-*k* indicating scheduled resources (e.g., time and frequency resources of a resource pool) to be used for transmission and reception (e.g., for a superposition transmission as described herein). For example, as part of sidelink transmission mode 1 ("fully controlled" mode), the base station may communicate the control signaling via DCI. In some other aspects, the base station may communicate control signaling to UE 115-*j* and UE 115-*k* indicating available resources (e.g., a configured resource pool) for transmission and reception. For example, as part of sidelink transmission mode 2 ("autonomous" mode) or mode 4 ("autonomous" mode independent of cellular coverage), UE 115-*j* may select a set of resources (e.g., time and frequency resources) from the configured resource pool. In an example, UE 115-*j* may communicate control signaling to UE 115-*k*, and the control signaling may indicate the set of resources used by UE 115-*j* for transmitting the first signal generated for the first radio access technology (e.g., LTE), the second signal generated for the second radio access technology (e.g., NR), or both. In some aspects, UE 115-*k* may communicate the control signaling.

Accordingly, UE 115-*j* may transmit a superimposed transmission of an LTE signal and an NR signal from a same antenna port in a same radio frequency resource. In some aspects, the NR slot structure may be modified so that the UE does not transmit during symbol periods in which LTE reference signals (e.g., LTE DMRSs) are transmitted, so as to avoid or reduce interference with the LTE reference signals.

In some aspects, for a legacy UE 115 (e.g., UE 115-*e* described herein), the legacy UE 115 may decode the first signal (e.g., the LTE signal) and ignore the control signaling with respect to the superposition transmission.

Figure 7:
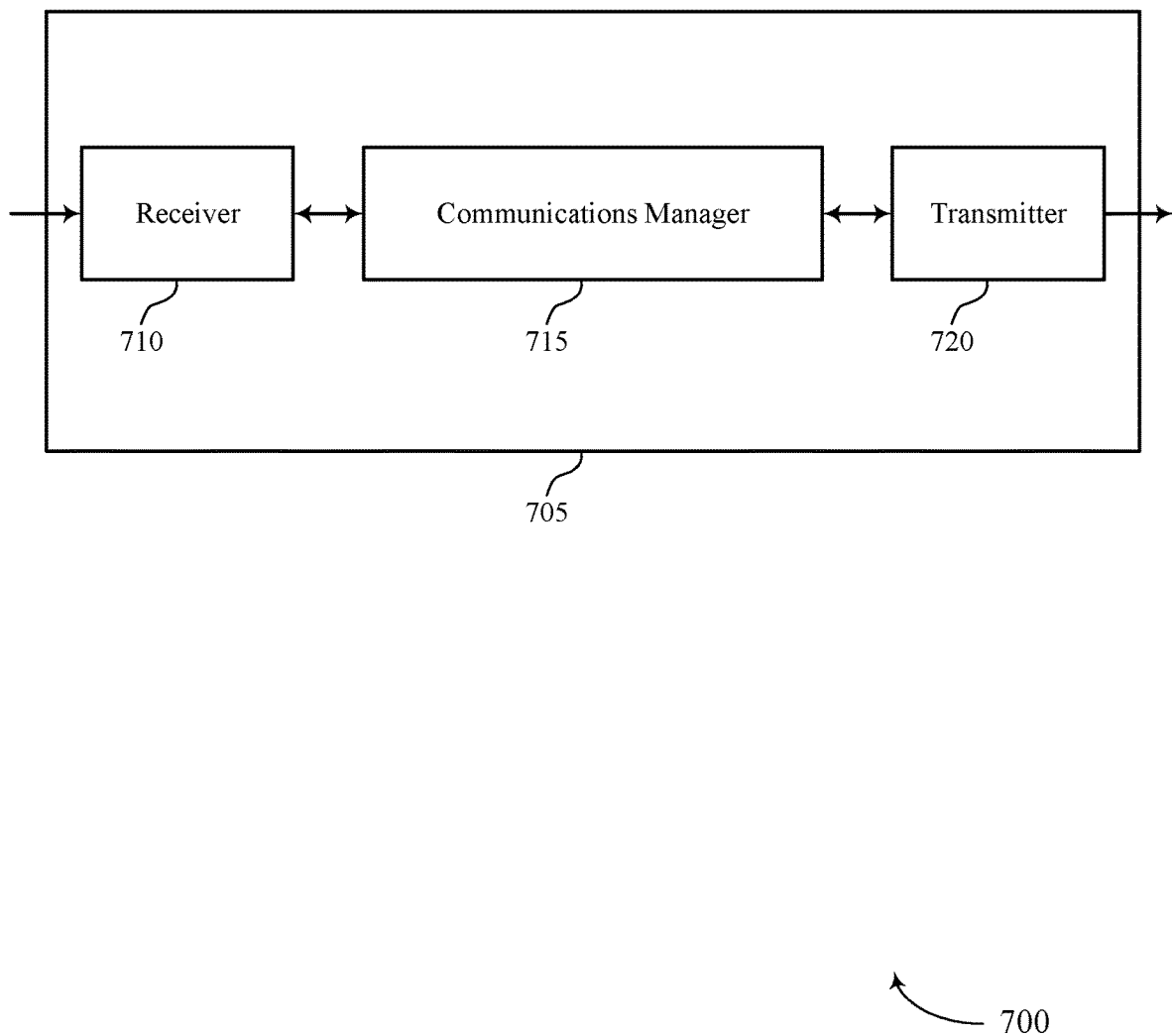
FIGS. 7 and 8 show block diagrams of devices that support slot structure for superposition transmission using a single antenna port in accordance with aspects of the present disclosure.

FIG. 7 shows a block diagram 700 of a device 705 in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to slot structure for superposition transmission using a single antenna port, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may communicate control signaling scheduling a superposition transmission of a first signal generated for a first radio access technology and a second signal generated for a second radio access technology, and indicating that the first signal and the second signal are each to be transmitted via a first antenna port within a first transmission time interval, transmit, via the first antenna port, the first signal within the first transmission time interval in accordance with a first signal format of the first radio access technology that includes at least one reference signal symbol period, and transmit, via the first antenna port, the second signal in a set of symbol periods of the first transmission time interval other than the at least one reference signal symbol period. The communications manager 715 may also communicate control signaling scheduling a superposition transmission of a first signal generated for a first radio access technology and a second signal generated for a second radio access technology, and indicating that the first signal and the second signal are each to be transmitted via a first antenna port within a first transmission time interval, receive the first signal within the first transmission time interval in accordance with a first signal format of the first radio access technology that includes at least one reference signal symbol period, and receive the second signal in a set of symbol periods of the first transmission time interval other than the at least one reference signal symbol period. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a DSP, an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
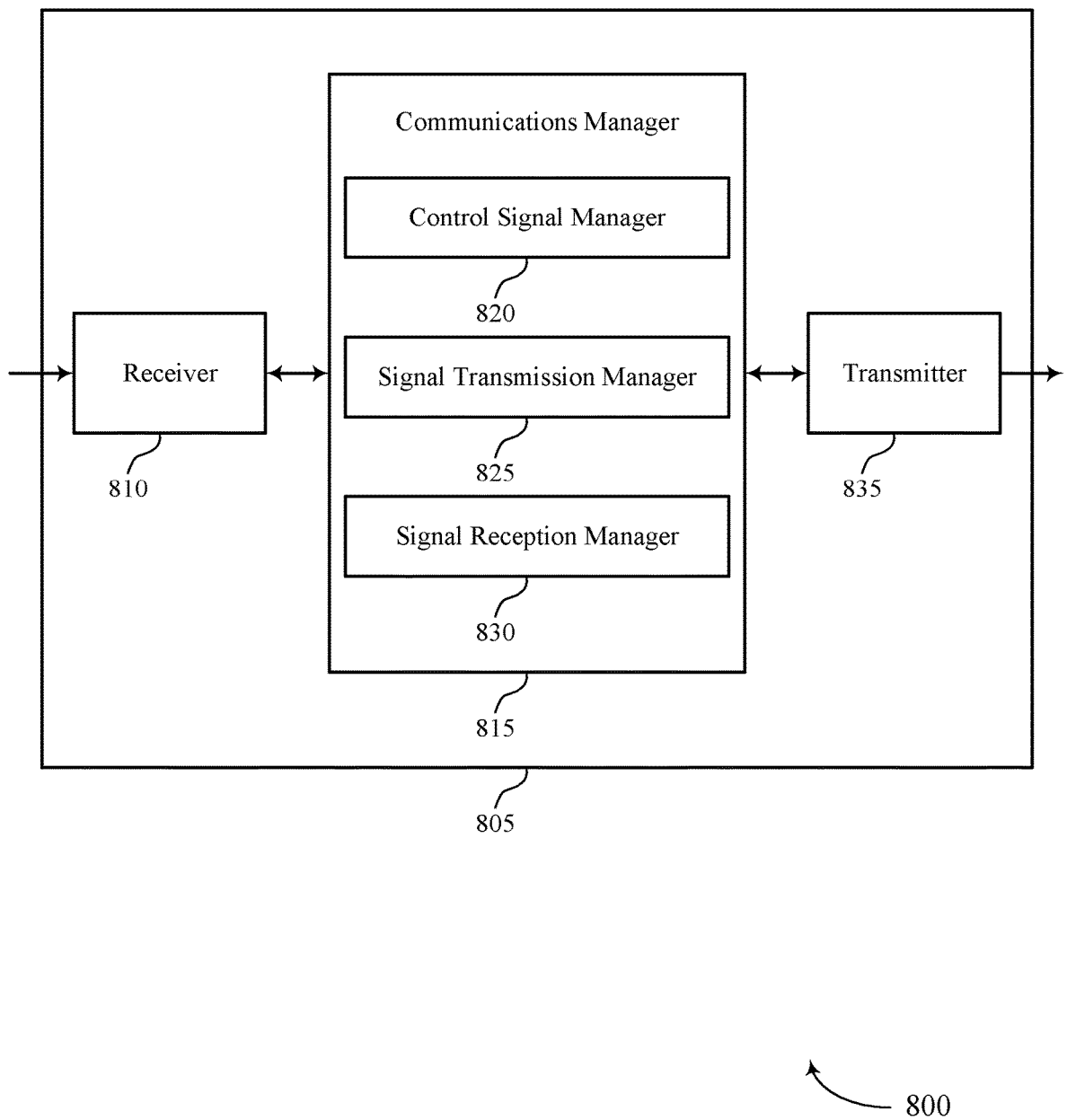

FIG. 8 shows a block diagram 800 of a device 805 in accordance with aspects of the present disclosure. The device 805 may be an example of aspects of a device 705, or a UE 115 as described herein. The device 805 may include a receiver 810, a communications manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to slot structure for superposition transmission using a single antenna port, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a control signal manager 820, a signal transmission manager 825, and a signal reception manager 830. The communications manager 815 may be an example of aspects of the communications manager 1010 described herein.

The control signal manager 820 may communicate control signaling scheduling a superposition transmission of a first signal generated for a first radio access technology and a second signal generated for a second radio access technology, and indicating that the first signal and the second signal are each to be transmitted via a first antenna port within a first transmission time interval.

The signal transmission manager 825 may transmit, via the first antenna port, the first signal within the first transmission time interval in accordance with a first signal format of the first radio access technology that includes at least one reference signal symbol period and transmit, via the first antenna port, the second signal in a set of symbol periods of the first transmission time interval other than the at least one reference signal symbol period.

The signal reception manager 830 may receive the first signal within the first transmission time interval in accordance with a first signal format of the first radio access technology that includes at least one reference signal symbol period and receive the second signal in a set of symbol periods of the first transmission time interval other than the at least one reference signal symbol period.

The transmitter 835 may transmit signals generated by other components of the device 805. In some examples, the transmitter 835 may be collocated with a receiver 810 in a transceiver module. For example, the transmitter 835 may be an example of aspects of the transceiver 1020 described with reference to FIG. 10. The transmitter 835 may utilize a single antenna or a set of antennas.

Figure 9:
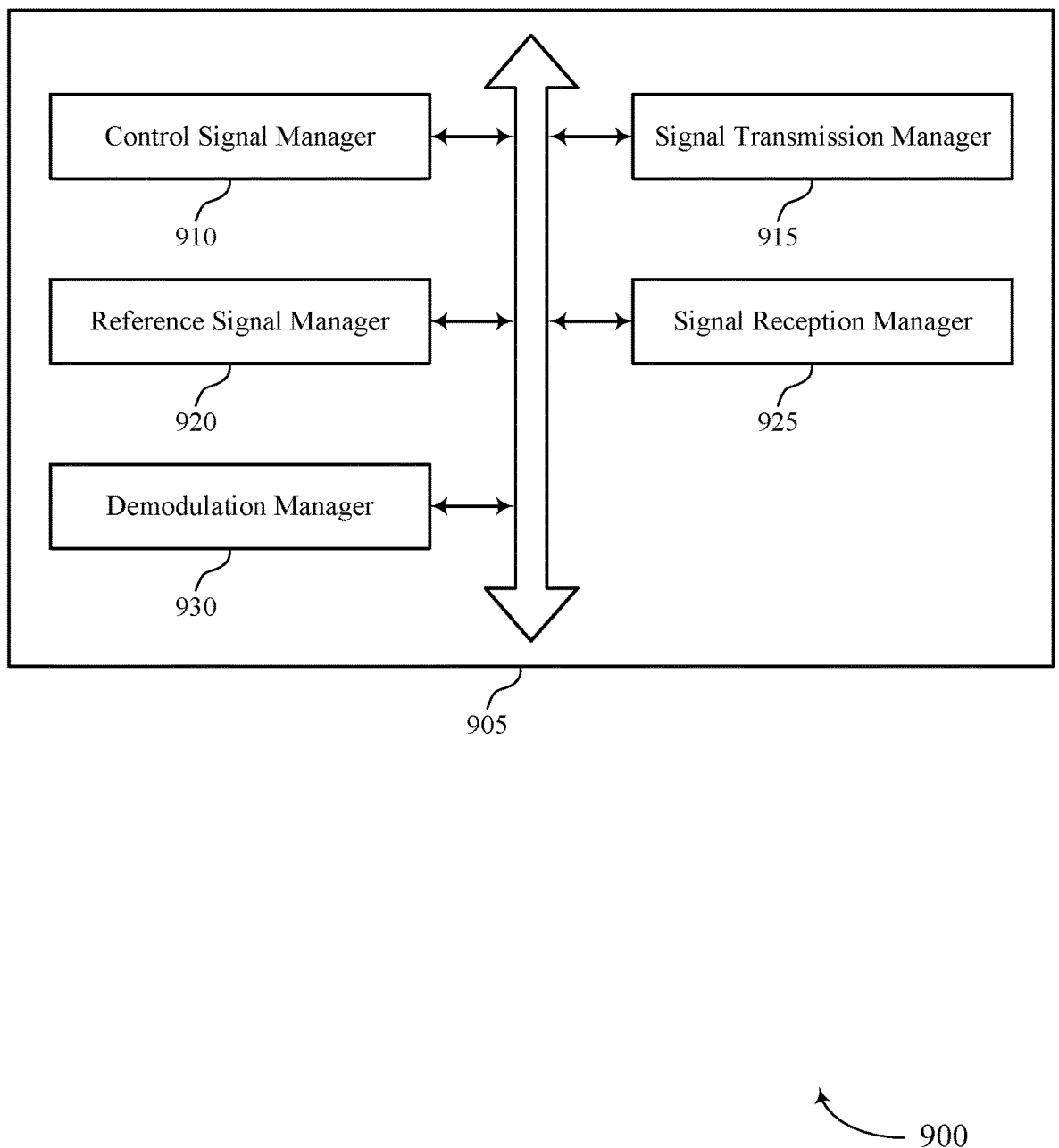
FIG. 9 shows a block diagram of a communications manager in accordance with aspects of the present disclosure.

FIG. 9 shows a block diagram 900 of a communications manager 905 in accordance with aspects of the present disclosure. The communications manager 905 may be an example of aspects of a communications manager 715, a communications manager 815, or a communications manager 1010 described herein. The communications manager 905 may include a control signal manager 910, a signal transmission manager 915, a reference signal manager 920, a signal reception manager 925, and a demodulation manager 930. Each of these modules may communicate, directly or indirectly, with one another (e.g., via one or more buses).

The control signal manager 910 may communicate control signaling scheduling a superposition transmission of a first signal generated for a first radio access technology and a second signal generated for a second radio access technology, and indicating that the first signal and the second signal are each to be transmitted via a first antenna port within a first transmission time interval.

The signal transmission manager 915 may transmit, via the first antenna port, the first signal within the first transmission time interval in accordance with a first signal format of the first radio access technology that includes at least one reference signal symbol period. In some examples, the signal transmission manager 915 may transmit, via the first antenna port, the second signal in a set of symbol periods of the first transmission time interval other than the at least one reference signal symbol period. In some examples, the signal transmission manager 915 may transmit the first signal within one or more symbol periods of the first transmission time interval allocated for a sidelink shared channel, a sidelink control channel, or both, in accordance with the first signal format of the first radio access technology. In some examples, the signal transmission manager 915 may transmit the first signal within a first bandwidth, where the second signal is transmitted within the first bandwidth. In some examples, the signal transmission manager 915 may transmit the first signal within a first bandwidth, where the second signal is transmitted within a second bandwidth that is different than the first bandwidth.

In some examples, the signal transmission manager 915 may transmit the first signal at a first transmission power level, where the second signal is transmitted at a second transmission power level that is different than the first transmission power level. In some examples, the signal transmission manager 915 may transmit the second signal in the set of symbol periods that differs from a second signal format for symbol periods within the first transmission time interval for the second radio access technology. In some examples, the signal transmission manager 915 may transmit the second signal that has at least one resource block shifted from a first symbol period to a second symbol within the first transmission time interval to avoid transmitting the at least one resource block within the at least one reference signal symbol period. In some examples, the signal transmission manager 915 may transmit the second signal based on a frequency offset corresponding to the first radio access technology. In some examples, the signal transmission manager 915 may transmit the second signal within one or more symbol periods of the first transmission time interval allocated for a sidelink shared channel, a sidelink control channel, or both, in accordance with the first signal format of the first radio access technology. In some cases, the first radio access technology is an LTE radio access technology and the second radio access technology is a New Radio (NR) radio access technology.

The signal reception manager 925 may receive the first signal within the first transmission time interval in accordance with a first signal format of the first radio access technology that includes at least one reference signal symbol period. In some examples, the signal reception manager 925 may receive the second signal in a set of symbol periods of the first transmission time interval other than the at least one reference signal symbol period. In some examples, the signal reception manager 925 may receive a reference signal of the first radio access technology within the at least one reference signal symbol period. In some examples, the signal reception manager 925 may receive the first signal within one or more symbol periods of the first transmission time interval allocated for a sidelink shared channel, a sidelink control channel, or both, in accordance with the first signal format of the first radio access technology.

In some examples, the signal reception manager 925 may receive the first signal within a first bandwidth, where the second signal is transmitted within the first bandwidth. In some examples, the signal reception manager 925 may receive the first signal within a first bandwidth, where the second signal is transmitted within a second bandwidth that is different than the first bandwidth. In some examples, the signal reception manager 925 may receive the second signal in the set of symbol periods that differs from a second signal format for symbol periods within the first transmission time interval for the second radio access technology. In some examples, the signal reception manager 925 may receive the second signal that has at least one resource block shifted from a first symbol period to a second symbol within the first transmission time interval to avoid transmitting the at least one resource block within the at least one reference signal symbol period.

In some examples, the signal reception manager 925 may receive the second signal based on a frequency offset corresponding to the first radio access technology. In some examples, the signal reception manager 925 may receive the second signal within one or more symbol periods of the first transmission time interval allocated for a sidelink shared channel, a sidelink control channel, or both, in accordance with the first signal format of the first radio access technology.

The reference signal manager 920 may transmit a reference signal of the first radio access technology within the at least one reference signal symbol period.

The demodulation manager 930 may demodulate the first signal, the second signal, or both, based on the reference signal.

Figure 10:
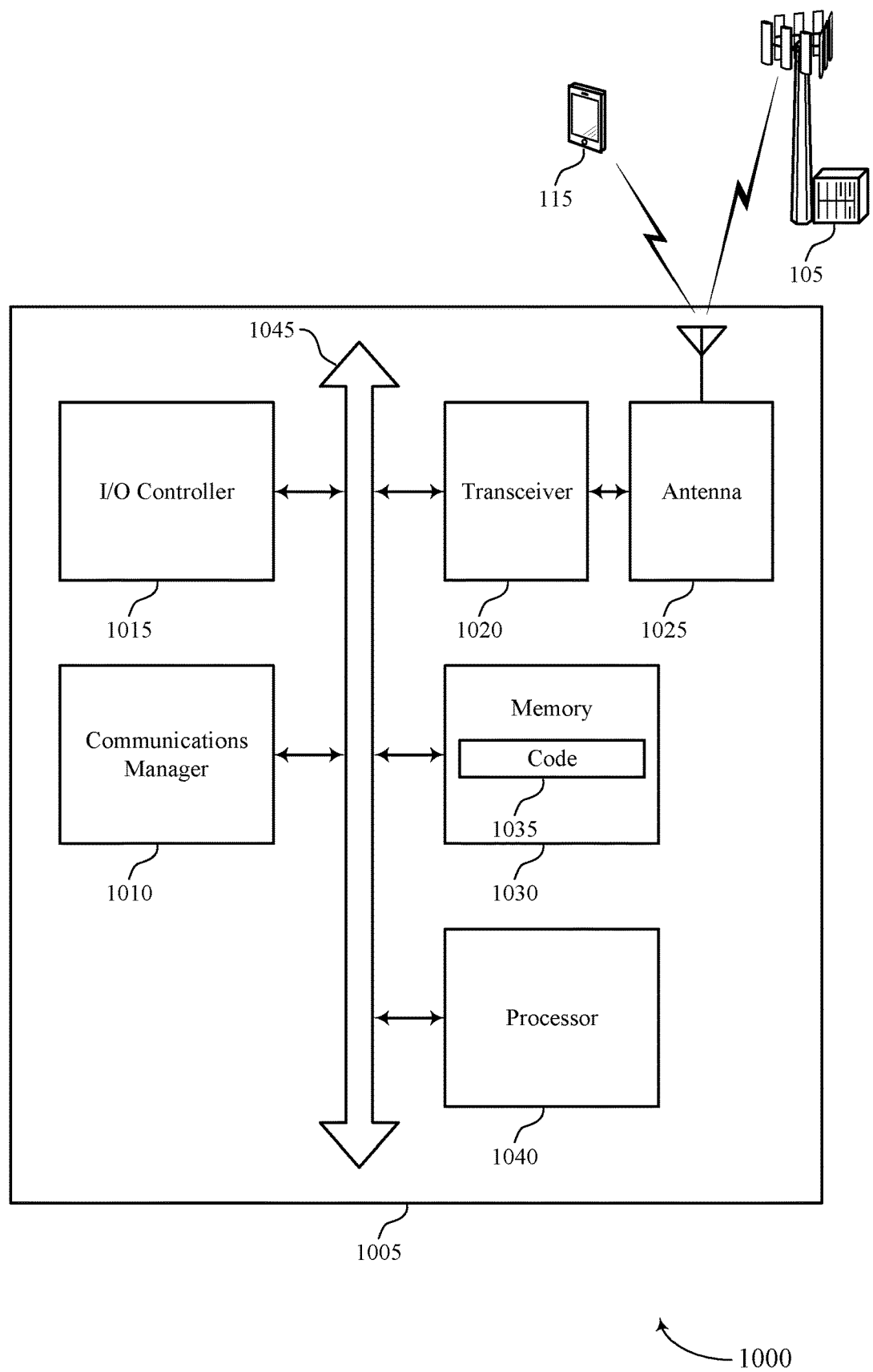
FIG. 10 shows a diagram of a system including a device in accordance with aspects of the present disclosure.

FIG. 10 shows a diagram of a system 1000 including a device 1005 in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may communicate control signaling scheduling a superposition transmission of a first signal generated for a first radio access technology and a second signal generated for a second radio access technology, and indicating that the first signal and the second signal are each to be transmitted via a first antenna port within a first transmission time interval, transmit, via the first antenna port, the first signal within the first transmission time interval in accordance with a first signal format of the first radio access technology that includes at least one reference signal symbol period, and transmit, via the first antenna port, the second signal in a set of symbol periods of the first transmission time interval other than the at least one reference signal symbol period. The communications manager 1010 may also communicate control signaling scheduling a superposition transmission of a first signal generated for a first radio access technology and a second signal generated for a second radio access technology, and indicating that the first signal and the second signal are each to be transmitted via a first antenna port within a first transmission time interval, receive the first signal within the first transmission time interval in accordance with a first signal format of the first radio access technology that includes at least one reference signal symbol period, and receive the second signal in a set of symbol periods of the first transmission time interval other than the at least one reference signal symbol period.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic input-output system (BIOS) which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting slot structure for superposition transmission using a single antenna port).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
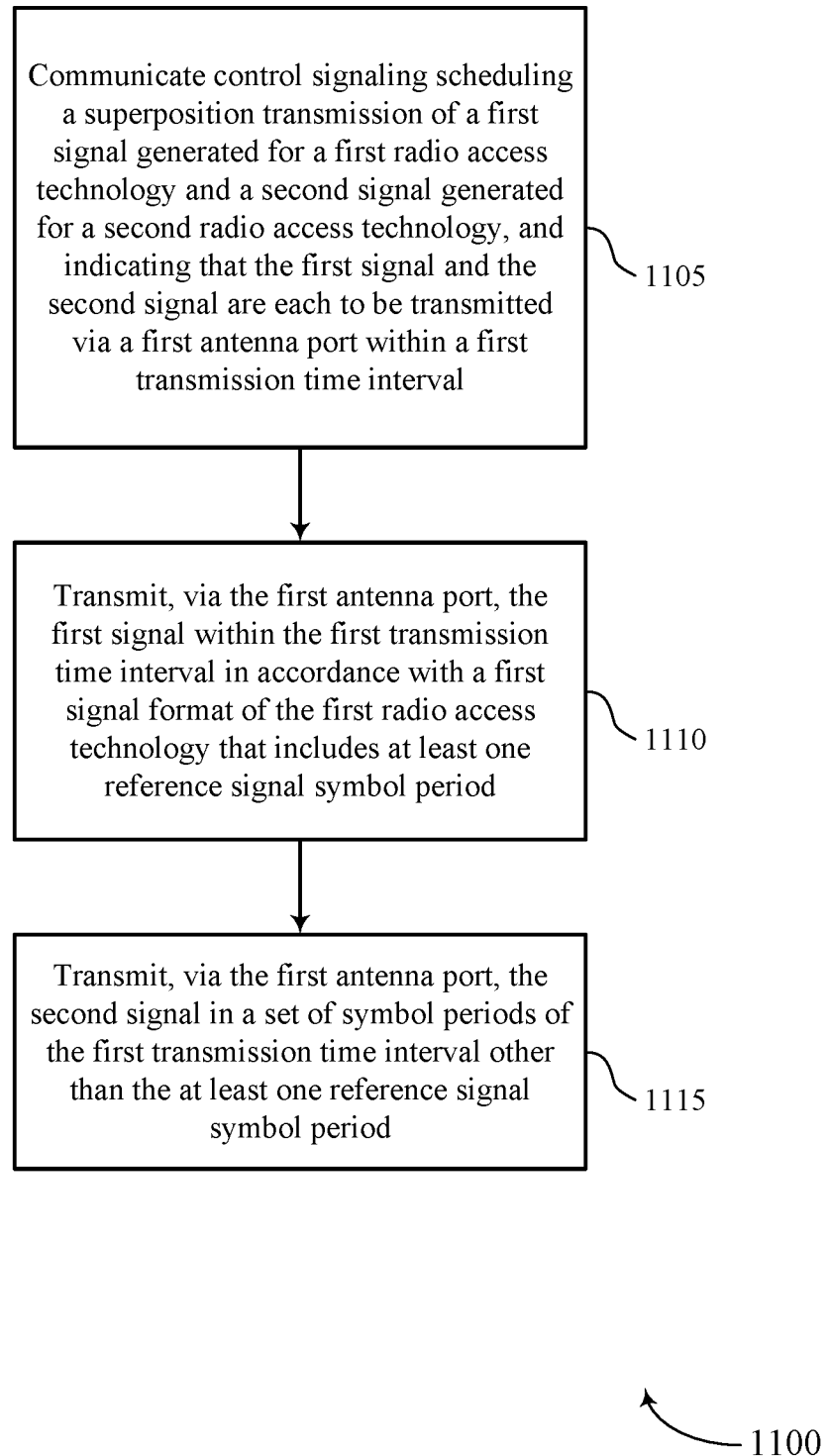
FIGS. 11 through 14 show flowcharts illustrating methods that support slot structure for superposition transmission using a single antenna port in accordance with aspects of the present disclosure.

FIG. 11 shows a flowchart illustrating a method 1100 in accordance with aspects of the present disclosure. The operations of method 1100 may be implemented by a UE 115 or its components as described herein. For example, the operations of method 1100 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1105, the UE may communicate control signaling scheduling a superposition transmission of a first signal generated for a first radio access technology and a second signal generated for a second radio access technology, and indicating that the first signal and the second signal are each to be transmitted via a first antenna port within a first transmission time interval. The operations of 1105 may be performed according to the methods described herein. In some examples, aspects of the operations of 1105 may be performed by a control signal manager as described with reference to FIGS. 7 through 10.

At 1110, the UE may transmit, via the first antenna port, the first signal within the first transmission time interval in accordance with a first signal format of the first radio access technology that includes at least one reference signal symbol period. The operations of 1110 may be performed according to the methods described herein. In some examples, aspects of the operations of 1110 may be performed by a signal transmission manager as described with reference to FIGS. 7 through 10.

At 1115, the UE may transmit, via the first antenna port, the second signal in a set of symbol periods of the first transmission time interval other than the at least one reference signal symbol period. The operations of 1115 may be performed according to the methods described herein. In some examples, aspects of the operations of 1115 may be performed by a signal transmission manager as described with reference to FIGS. 7 through 10.

Figure 12:
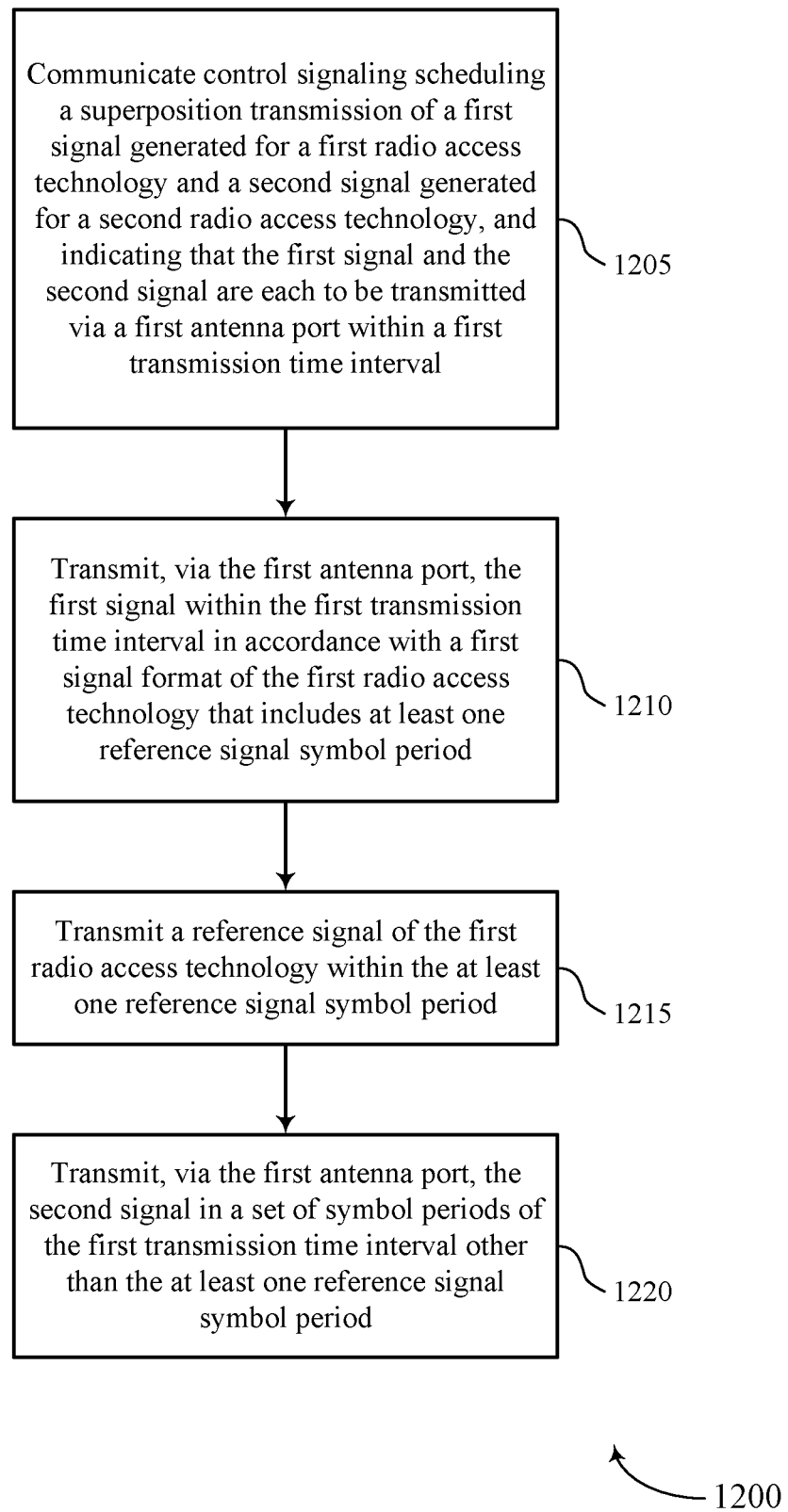

FIG. 12 shows a flowchart illustrating a method 1200 in accordance with aspects of the present disclosure. The operations of method 1200 may be implemented by a UE 115 or its components as described herein. For example, the operations of method 1200 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1205, the UE may communicate control signaling scheduling a superposition transmission of a first signal generated for a first radio access technology and a second signal generated for a second radio access technology, and indicating that the first signal and the second signal are each to be transmitted via a first antenna port within a first transmission time interval. The operations of 1205 may be performed according to the methods described herein. In some examples, aspects of the operations of 1205 may be performed by a control signal manager as described with reference to FIGS. 7 through 10.

At 1210, the UE may transmit, via the first antenna port, the first signal within the first transmission time interval in accordance with a first signal format of the first radio access technology that includes at least one reference signal symbol period. The operations of 1210 may be performed according to the methods described herein. In some examples, aspects of the operations of 1210 may be performed by a signal transmission manager as described with reference to FIGS. 7 through 10.

At 1215, the UE may transmit a reference signal of the first radio access technology within the at least one reference signal symbol period. The operations of 1215 may be performed according to the methods described herein. In some examples, aspects of the operations of 1215 may be performed by a reference signal manager as described with reference to FIGS. 7 through 10.

At 1220, the UE may transmit, via the first antenna port, the second signal in a set of symbol periods of the first transmission time interval other than the at least one reference signal symbol period. The operations of 1220 may be performed according to the methods described herein. In some examples, aspects of the operations of 1220 may be performed by a signal transmission manager as described with reference to FIGS. 7 through 10.

Figure 13:
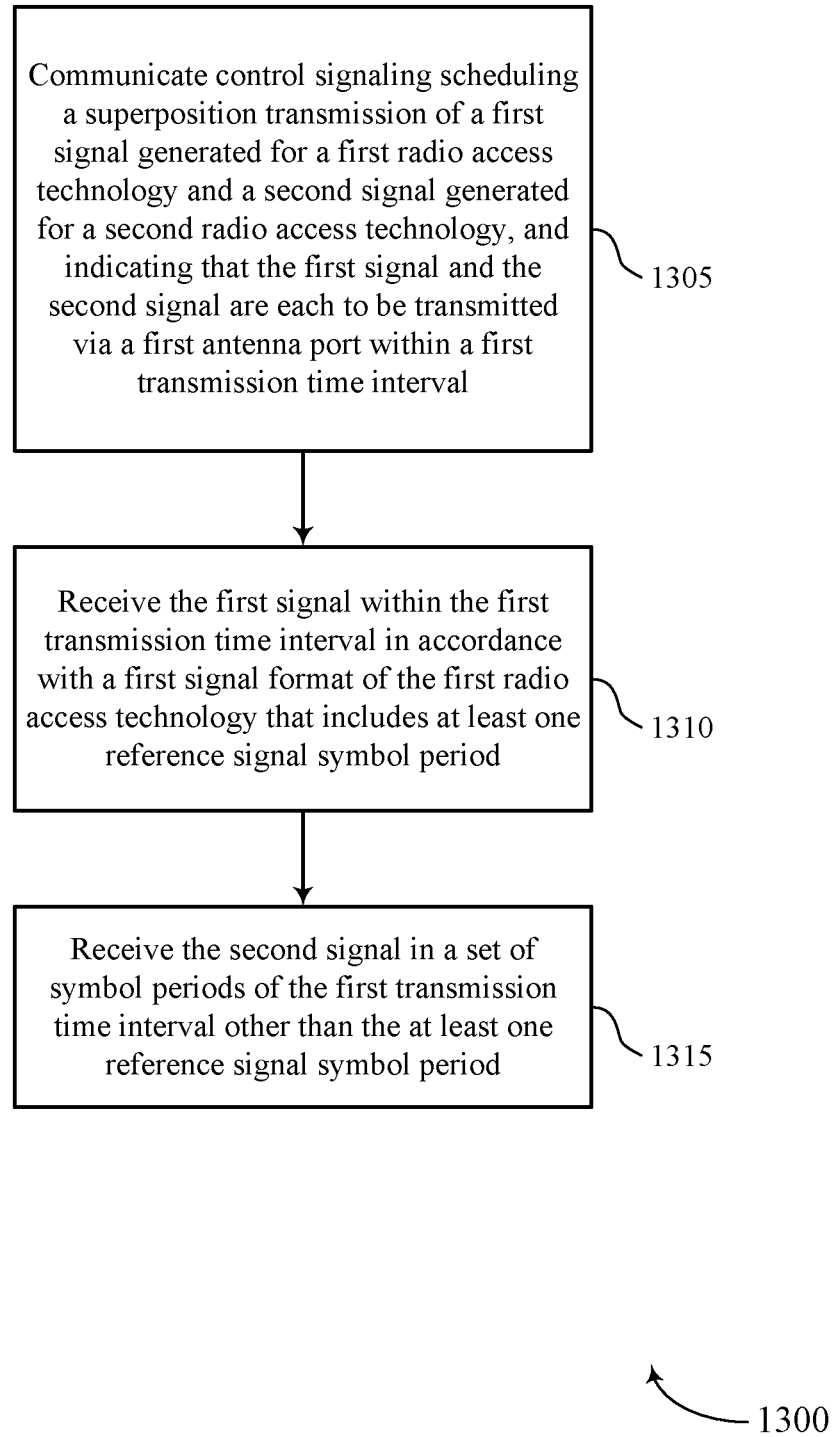

FIG. 13 shows a flowchart illustrating a method 1300 in accordance with aspects of the present disclosure. The operations of method 1300 may be implemented by a UE 115 or its components as described herein. For example, the operations of method 1300 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1305, the UE may communicate control signaling scheduling a superposition transmission of a first signal generated for a first radio access technology and a second signal generated for a second radio access technology, and indicating that the first signal and the second signal are each to be transmitted via a first antenna port within a first transmission time interval. The operations of 1305 may be performed according to the methods described herein. In some examples, aspects of the operations of 1305 may be performed by a control signal manager as described with reference to FIGS. 7 through 10.

At 1310, the UE may receive the first signal within the first transmission time interval in accordance with a first signal format of the first radio access technology that includes at least one reference signal symbol period. The operations of 1310 may be performed according to the methods described herein. In some examples, aspects of the operations of 1310 may be performed by a signal reception manager as described with reference to FIGS. 7 through 10.

At 1315, the UE may receive the second signal in a set of symbol periods of the first transmission time interval other than the at least one reference signal symbol period. The operations of 1315 may be performed according to the methods described herein. In some examples, aspects of the operations of 1315 may be performed by a signal reception manager as described with reference to FIGS. 7 through 10.

Figure 14:
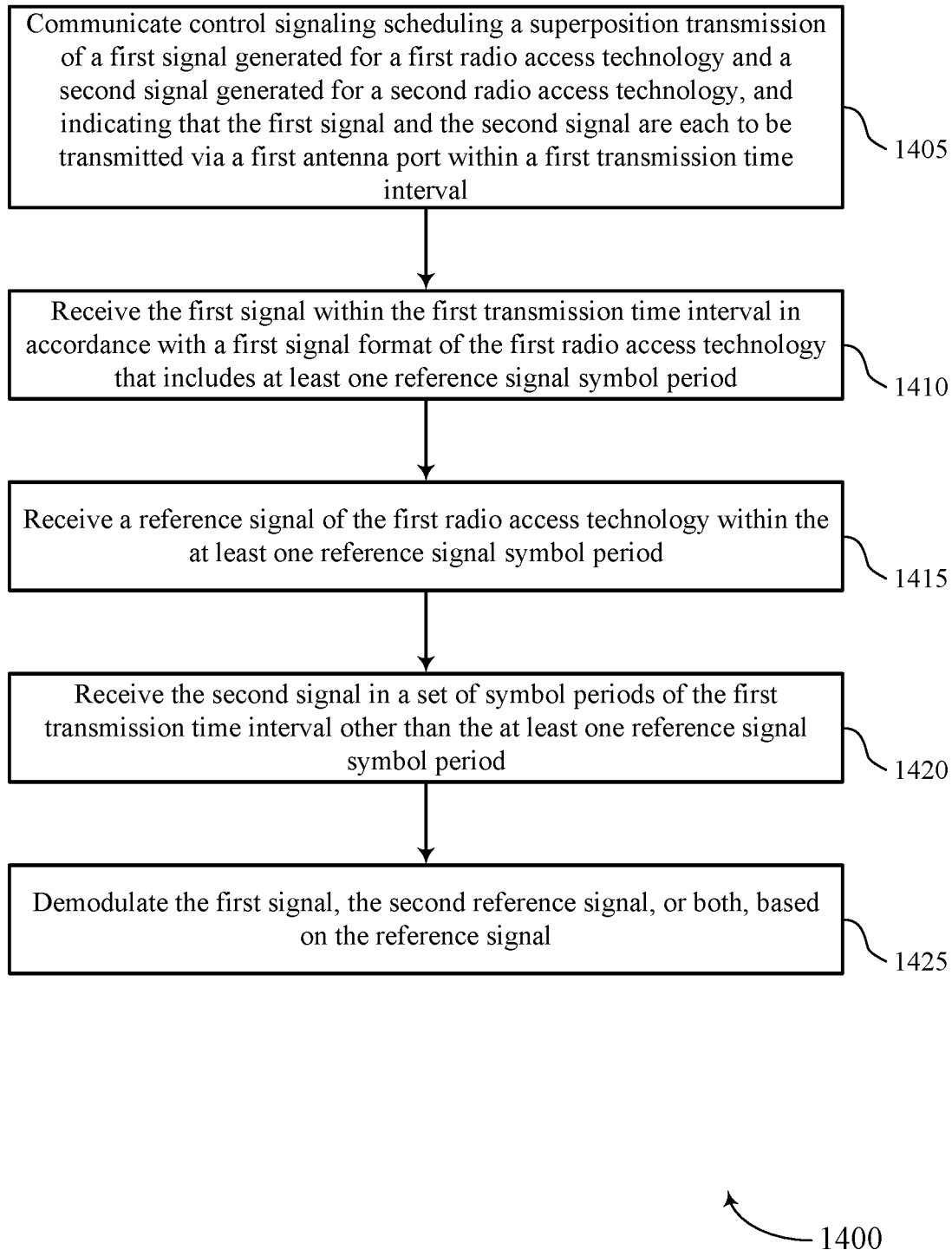

FIG. 14 shows a flowchart illustrating a method 1400 in accordance with aspects of the present disclosure. The operations of method 1400 may be implemented by a UE 115 or its components as described herein. For example, the operations of method 1400 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1405, the UE may communicate control signaling scheduling a superposition transmission of a first signal generated for a first radio access technology and a second signal generated for a second radio access technology, and indicating that the first signal and the second signal are each to be transmitted via a first antenna port within a first transmission time interval. The operations of 1405 may be performed according to the methods described herein. In some examples, aspects of the operations of 1405 may be performed by a control signal manager as described with reference to FIGS. 7 through 10.

At 1410, the UE may receive the first signal within the first transmission time interval in accordance with a first signal format of the first radio access technology that includes at least one reference signal symbol period. The operations of 1410 may be performed according to the methods described herein. In some examples, aspects of the operations of 1410 may be performed by a signal reception manager as described with reference to FIGS. 7 through 10.

At 1415, the UE may receive a reference signal of the first radio access technology within the at least one reference signal symbol period. The operations of 1415 may be performed according to the methods described herein. In some examples, aspects of the operations of 1415 may be performed by a signal reception manager as described with reference to FIGS. 7 through 10.

At 1420, the UE may receive the second signal in a set of symbol periods of the first transmission time interval other than the at least one reference signal symbol period. The operations of 1420 may be performed according to the methods described herein. In some examples, aspects of the operations of 1420 may be performed by a signal reception manager as described with reference to FIGS. 7 through 10.

At 1425, the UE may demodulate the first signal, the second signal, or both, based on the reference signal. The operations of 1425 may be performed according to the methods described herein. In some examples, aspects of the operations of 1425 may be performed by a demodulation manager as described with reference to FIGS. 7 through 10.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications by a user equipment (UE), comprising:
   communicating control signaling scheduling a superposition transmission of a first signal generated for a first radio access technology and a second signal generated for a second radio access technology, and indicating that the first signal and the second signal are each to be transmitted via a first antenna port within a first transmission time interval;
   transmitting, via the first antenna port, the first signal within one or more symbol periods of the first transmission time interval allocated for a sidelink shared channel, a sidelink control channel, or both, in accordance with a first signal format of the first radio access technology that includes at least one reference signal symbol period; and
   transmitting, via the first antenna port, the second signal in a plurality of symbol periods of the first transmission time interval other than the at least one reference signal symbol period.

2. The method of claim 1, further comprising:
   transmitting a reference signal of the first radio access technology within the at least one reference signal symbol period.

3. The method of claim 1, wherein transmitting the first signal comprises:
   transmitting the first signal within a first bandwidth, wherein the second signal is transmitted within the first bandwidth.

4. The method of claim 1, wherein transmitting the first signal comprises:
   transmitting the first signal within a first bandwidth, wherein the second signal is transmitted within a second bandwidth that is different than the first bandwidth.

5. The method of claim 1, wherein transmitting the first signal comprises:
   transmitting the first signal at a first transmission power level, wherein the second signal is transmitted at a second transmission power level that is different than the first transmission power level.

6. The method of claim 1, wherein transmitting the second signal comprises:
   transmitting the second signal in the plurality of symbol periods that differs from a second signal format for symbol periods within the first transmission time interval for the second radio access technology.

7. The method of claim 6, wherein transmitting the second signal comprises:
   transmitting the second signal that has at least one resource block shifted from a first symbol period to a second symbol within the first transmission time interval to avoid transmitting the at least one resource block within the at least one reference signal symbol period.

8. The method of claim 1, wherein transmitting the second signal comprises:
   transmitting the second signal based at least in part on a frequency offset corresponding to the first radio access technology.

9. The method of claim 1, wherein transmitting the second signal comprises:
   transmitting the second signal within the one or more symbol periods of the first transmission time interval allocated for the sidelink shared channel, the sidelink control channel, or both, in accordance with the first signal format of the first radio access technology.

10. The method of claim 1, wherein the first radio access technology is a Long Term Evolution (LTE) radio access technology and the second radio access technology is a New Radio (NR) radio access technology.

11. A method for wireless communications by a user equipment (UE), comprising:
   communicating control signaling scheduling a superposition transmission of a first signal generated for a first radio access technology and a second signal generated for a second radio access technology, and indicating that the first signal and the second signal are each to be transmitted via a first antenna port within a first transmission time interval;
   receiving the first signal within one or more symbol periods of the first transmission time interval allocated for a sidelink shared channel, a sidelink control channel, or both, in accordance with a first signal format of the first radio access technology that includes at least one reference signal symbol period; and
   receiving the second signal in a plurality of symbol periods of the first transmission time interval other than the at least one reference signal symbol period.

12. The method of claim 11, further comprising:
   receiving a reference signal of the first radio access technology within the at least one reference signal symbol period.

13. The method of claim 12, further comprising:
demodulating the first signal, the second signal, or both, based at least in part on the reference signal.

14. The method of claim 11, wherein receiving the first signal comprises:
receiving the first signal within a first bandwidth, wherein the second signal is transmitted within the first bandwidth.

15. The method of claim 11, wherein receiving the first signal comprises:
receiving the first signal within a first bandwidth, wherein the second signal is transmitted within a second bandwidth that is different than the first bandwidth.

16. The method of claim 11, wherein receiving the second signal comprises:
receiving the second signal in the plurality of symbol periods that differs from a second signal format for symbol periods within the first transmission time interval for the second radio access technology.

17. The method of claim 16, wherein receiving the second signal comprises:
receiving the second signal that has at least one resource block shifted from a first symbol period to a second symbol within the first transmission time interval to avoid transmitting the at least one resource block within the at least one reference signal symbol period.

18. The method of claim 11, wherein receiving the second signal comprises:
receiving the second signal based at least in part on a frequency offset corresponding to the first radio access technology.

19. The method of claim 11, wherein receiving the second signal comprises:
receiving the second signal within the one or more symbol periods of the first transmission time interval allocated for the sidelink shared channel, the sidelink control channel, or both, in accordance with the first signal format of the first radio access technology.

20. The method of claim 11, wherein the first radio access technology is a Long Term Evolution (LTE) radio access technology and the second radio access technology is a New Radio (NR) radio access technology.

21. An apparatus for wireless communications by a user equipment (UE), comprising:
a processor, memory coupled with the processor; and
instructions stored in the memory and executable by the processor to cause the apparatus to:
communicate control signaling scheduling a superposition transmission of a first signal generated for a first radio access technology and a second signal generated for a second radio access technology, and indicating that the first signal and the second signal are each to be transmitted via a first antenna port within a first transmission time interval;
transmit, via the first antenna port, the first signal within one or more symbol periods of the first transmission time interval allocated for a sidelink shared channel, a sidelink control channel, or both, in accordance with a first signal format of the first radio access technology that includes at least one reference signal symbol period; and
transmit, via the first antenna port, the second signal in a plurality of symbol periods of the first transmission time interval other than the at least one reference signal symbol period.

22. The apparatus of claim 21, further comprising a transmitter, wherein the instructions are further executable by the processor to cause the apparatus to:
transmit, via the transmitter, a reference signal of the first radio access technology within the at least one reference signal symbol period.

23. The apparatus of claim 21, wherein the instructions to transmit the first signal are executable by the processor to cause the apparatus to:
transmit the first signal within a first bandwidth, wherein the second signal is transmitted within the first bandwidth.

24. The apparatus of claim 21, wherein the instructions to transmit the first signal are executable by the processor to cause the apparatus to:
transmit the first signal within a first bandwidth, wherein the second signal is transmitted within a second bandwidth that is different than the first bandwidth.

25. An apparatus for wireless communications by a user equipment (UE), comprising:
a processor, memory coupled with the processor; and
instructions stored in the memory and executable by the processor to cause the apparatus to:
communicate control signaling scheduling a superposition transmission of a first signal generated for a first radio access technology and a second signal generated for a second radio access technology, and indicating that the first signal and the second signal are each to be transmitted via a first antenna port within a first transmission time interval;
receive the first signal within one or more symbol periods of the first transmission time interval allocated for a sidelink shared channel, a sidelink control channel, or both, in accordance with a first signal format of the first radio access technology that includes at least one reference signal symbol period; and
receive the second signal in a plurality of symbol periods of the first transmission time interval other than the at least one reference signal symbol period.

26. The apparatus of claim 25, wherein the instructions are further executable by the processor to cause the apparatus to:
receive a reference signal of the first radio access technology within the at least one reference signal symbol period.

27. The apparatus of claim 26, wherein the instructions are further executable by the processor to cause the apparatus to:
demodulate the first signal, the second signal, or both, based at least in part on the reference signal.

* * * * *